United States Patent
Shimonishi et al.

(10) Patent No.: US 11,577,620 B2
(45) Date of Patent: Feb. 14, 2023

(54) INFORMATION CALCULATION SYSTEM FOR BATTERY DEGRADATION

(71) Applicant: DENSO CORPORATION, Kariya (JP)

(72) Inventors: Yuta Shimonishi, Kariya (JP); Shuhei Yoshida, Kariya (JP)

(73) Assignee: DENSO CORPORATION, Kariya (JP)

( * ) Notice: Subject to any disclaimer, the term of this patent is extended or adjusted under 35 U.S.C. 154(b) by 52 days.

(21) Appl. No.: 17/182,897

(22) Filed: Feb. 23, 2021

(65) Prior Publication Data

US 2021/0268927 A1 Sep. 2, 2021

(30) Foreign Application Priority Data

Feb. 28, 2020 (JP) .............................. JP2020-032714

(51) Int. Cl.
*B60L 53/62* (2019.01)
*H01M 10/42* (2006.01)
*G05B 17/02* (2006.01)
*G07C 5/00* (2006.01)
*B60L 58/12* (2019.01)
(Continued)

(52) U.S. Cl.
CPC .............. *B60L 53/62* (2019.02); *B60L 53/63* (2019.02); *B60L 53/66* (2019.02); *B60L 58/12* (2019.02); *B60L 58/16* (2019.02); *G05B 17/02* (2013.01); *G07C 5/008* (2013.01); *H01M 10/425* (2013.01); *B60L 2240/545* (2013.01); *H01M 2010/4271* (2013.01)

(58) Field of Classification Search
CPC .......... B60L 53/62; B60L 53/66; B60L 53/63; B60L 58/12; B60L 58/16; B60L 2240/545; H01M 10/425; H01M 2010/4271; G01R 31/36; G01R 31/385; G01R 31/392
USPC .................................................. 320/109, 134
See application file for complete search history.

(56) References Cited

U.S. PATENT DOCUMENTS 10,523,029 B2 * 12/2019 Arai .................... H01M 10/486
2006/0252531 A1 11/2006 Kando et al.
(Continued)

FOREIGN PATENT DOCUMENTS

JP 2000-089175 A 3/2000
JP 4262217 B2 5/2009
(Continued)

*Primary Examiner* — Nathaniel R Pelton
(74) *Attorney, Agent, or Firm* — Oliff PLC

(57) ABSTRACT

An information calculation system acquires a battery load history of a secondary battery that has been used. The information calculation system calculates first degradation states of a plurality of battery constituent elements of the secondary battery, based on the battery load history acquired and a plurality of degradation factors related to each of the battery constituent elements. The information calculation system acquires estimated load information on a load that is estimated to act on the secondary battery when the secondary battery is used in a future application. The information calculation system calculates future second degradation states of the plurality of battery constituent elements of the secondary battery when the secondary battery is used in the future application, based on the first degradation states related to the battery constituent elements calculated, the estimated load information acquired, and the plurality of degradation factors related to the battery constituent elements.

7 Claims, 18 Drawing Sheets

(51) Int. Cl.
  *B60L 58/16* (2019.01)
  *B60L 53/63* (2019.01)
  *B60L 53/66* (2019.01)

(56) References Cited

U.S. PATENT DOCUMENTS

| | | |
|---|---|---|
| 2013/0057291 A1 | 3/2013 | Takahashi et al. |
| 2014/0320144 A1 | 10/2014 | Nakaya |
| 2017/0062883 A1 | 3/2017 | Nakaya |
| 2017/0324124 A1 | 11/2017 | Nakaya |
| 2018/0301770 A1 | 10/2018 | Nakaya |

FOREIGN PATENT DOCUMENTS

| | | |
|---|---|---|
| JP | 2010-160799 A | 7/2010 |
| JP | 2013-120640 A | 6/2013 |
| JP | 2013-181875 A | 9/2013 |
| JP | 2014-041768 A | 3/2014 |
| WO | 2011/145161 A1 | 11/2011 |

* cited by examiner

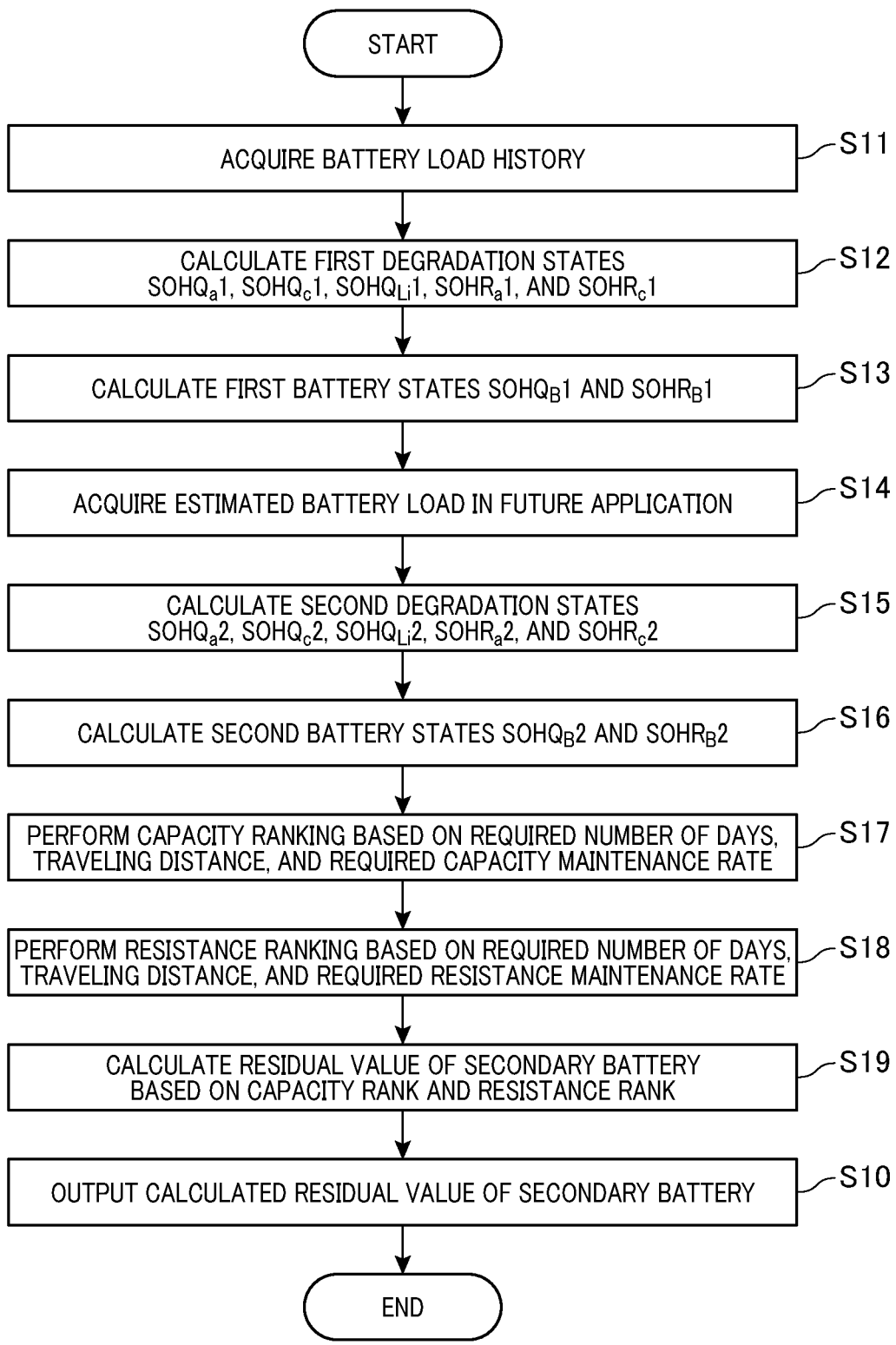

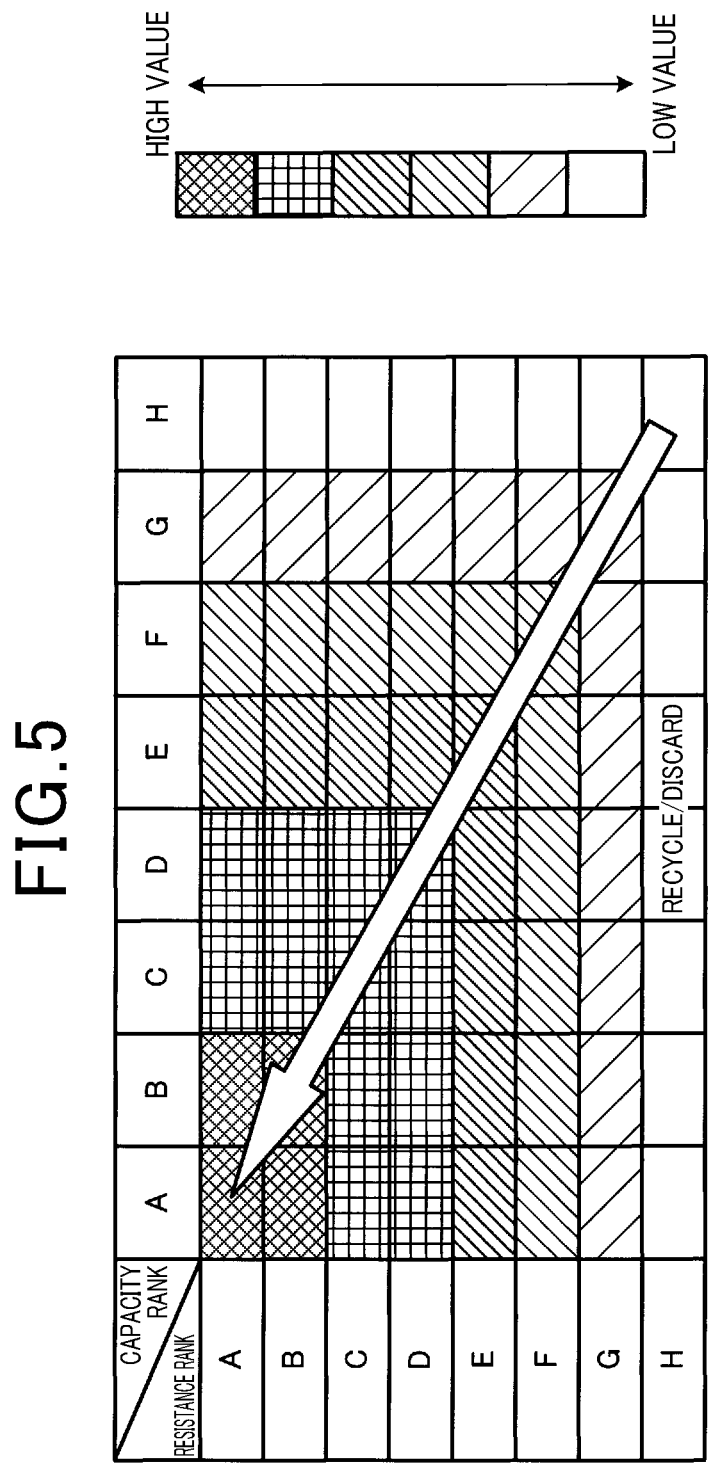

INFORMATION CALCULATION SYSTEM FOR BATTERY DEGRADATION

CROSS-REFERENCE TO RELATED APPLICATIONS

This application is based on and claims the benefit of priority from Japanese Patent Application No. 2020-032714, filed on Feb. 28, 2020. The entire disclosure of the above application is incorporated herein by reference.

BACKGROUND

Technical Field

The present disclosure relates to an information calculation system.

Related Art

An apparatus for predicting a state of degradation of a storage battery at time of reuse is known. For example, when a storage battery that is used in a vehicular application is reused in a residential application, this apparatus predicts the state of degradation of the storage battery.

SUMMARY

One aspect of the present disclosure provides an information calculation system. The information calculation system acquires a battery load history of a secondary battery that has been used. The information calculation system calculates first degradation states of a plurality of battery constituent elements of the secondary battery, based on the battery load history acquired and a plurality of degradation factors related to each of the battery constituent elements. The information calculation system acquires estimated load information on a load that is estimated to act on the secondary battery when the secondary battery is used in a future application. The information calculation system calculates future second degradation states of the plurality of battery constituent elements of the secondary battery when the secondary battery is used in the future application, based on the first degradation states related to the battery constituent elements calculated, the estimated load information acquired, and the plurality of degradation factors related to the battery constituent elements.

BRIEF DESCRIPTION OF THE DRAWINGS

In the accompanying drawings:

FIG. 2 is a flowchart for explaining a process performed by the information calculation system according to the first embodiment;

FIG. 5 is a diagram of a relationship between capacity rank, resistance rank, and a residual value of the secondary battery, according to the first embodiment;

DESCRIPTION OF THE EMBODIMENTS

Figure 1:
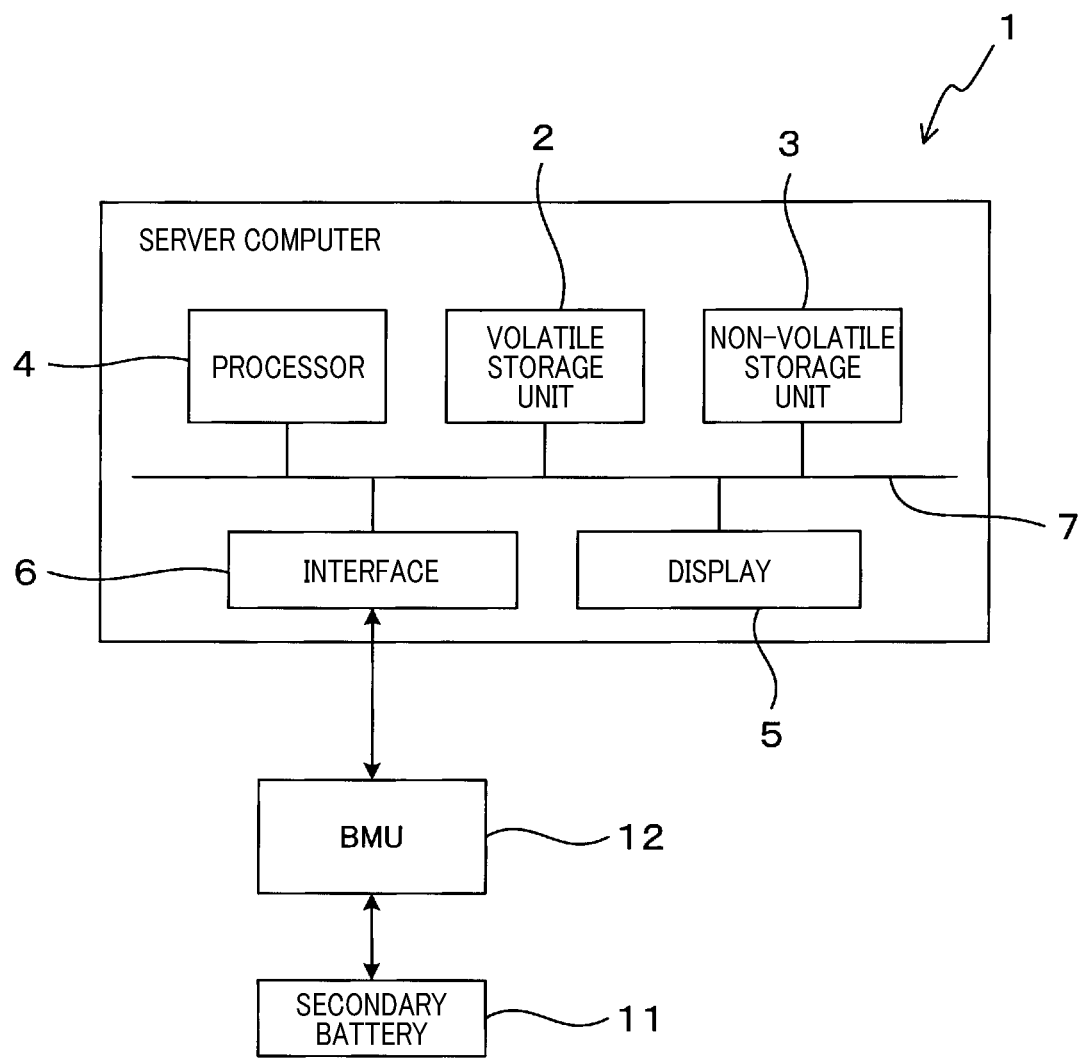
FIG. 1 is a configuration diagram of an information calculation system, a BMU, and a secondary battery according to a first embodiment.

JP-A-2013-120640 discloses a storage battery transfer support apparatus that predicts a state of degradation of a storage battery at time of reuse. For example, the storage battery transfer support apparatus predicts the state of degradation of a storage battery when a storage battery that is used in a vehicular application is reused in a residential application.

However, in the storage battery transfer support apparatus described in JP-A-2013-120640, accuracy of the prediction regarding the degradation of the storage battery at the time of reuse is insufficient. There is room for improvement.

It is thus desired to provide an information calculation system that is capable of improving accuracy of degradation prediction and degradation diagnosis regarding a secondary battery after initial use and at time of reuse.

An exemplary embodiment of the present disclosure provides an information calculation system that includes: a history acquiring unit that acquires a battery load history of a secondary battery that has been used; a first degradation calculating unit that calculates first degradation states of a plurality of battery constituent elements of the secondary battery, based on the battery load history acquired by the history acquiring unit and a plurality of degradation factors related to each of the battery constituent elements; an estimated load acquiring unit that acquires estimated load information on a load that is estimated to act on the secondary battery when the secondary battery is used in a future application; and a second degradation calculating unit that calculates future second degradation states of the plurality of battery constituent elements of the secondary battery when the secondary battery is used in the future application, based on the first degradation states related to the battery constituent elements calculated by the first degradation calculating unit, the estimated load information acquired by the estimated load acquiring unit, and the plurality of degradation factors related to the battery constituent elements.

The second degradation calculating unit of the information calculation system according to the above-described aspect calculates the future second degradation states of the plurality of battery constituent elements of the secondary battery when the secondary battery is used in the future application, based on the first degradation states related to the battery constituent elements, the estimated load information, and the plurality of degradation factors related to the battery constituent elements. Therefore, the second degradation states of the secondary battery when the secondary battery is used in the future application can be predicted with high accuracy.

As described above, according to the above-described aspect, an information calculation system that is capable of improving accuracy of degradation prediction and degradation diagnosis regarding a secondary battery after initial use and at time of reuse can be provided.

First Embodiment

An embodiment of an information calculation system will be described with reference to FIG. 1 to FIG. 8.

An information calculation system 1 according to the present embodiment is a system that calculates a residual value of a secondary battery 11 that has been used, based on a reuse application of the secondary battery 11.

For example, the secondary battery 11 is used in various applications, such as for vehicle driving and power supply in buildings (such as housing, buildings, factories). Here, when the secondary battery 11 is used for vehicle driving, charging and discharge of a large current is repeatedly performed in the secondary battery 11. Therefore, the secondary battery 11 is required to have high performance Meanwhile, when the secondary battery 11 is used for power supply in a building, the performance required of the secondary battery 11 is lower than that when the secondary battery 11 is used for vehicle driving.

Therefore, for example, a secondary battery 11 that no longer satisfies the required performance for vehicle driving may be able to be sufficiently used in applications such as for power supply for a building. In addition, for example, the secondary battery 11 that is put to primary use in a vehicle that requires relatively high performance from the secondary battery 11 can be reused in a vehicle that requires relatively lower performance from the secondary battery 11.

Here, the information calculation system 1 according to the present embodiment is used to support reuse of the secondary battery 11. The information calculation system 1 calculates a residual value of the secondary battery 11 that has been put to primary use, based on an application in which the secondary battery 11 will be used in the future and performance required in a specific secondary-use application. According to the present embodiment, the primary use (that is, a past use) of the secondary battery 11 is vehicle driving. Here, according to the present embodiment, vehicle driving is given as an example of the primary use. However, other applications are possible.

The vehicle that is used in the primary use of the secondary battery 11 is an electric vehicle or a hybrid vehicle. During the primary use, the secondary battery 11 is arranged under a floor of the vehicle or the like. The secondary battery 11 is used as a power source for each section (such as a rotating electric machine) of the vehicle.

The secondary battery 11 that is mounted in the vehicle includes a plurality of battery cells that are connected to each other in series. The secondary battery 11 may be configured by a battery pack that includes a plurality of battery modules in which the plurality of battery cells are arrayed in a single row. Each battery cell may be made of a lithium-ion secondary battery. A negative electrode of the secondary battery 11 may be made of a negative-electrode active material, such as graphite, that is capable of storing and releasing lithium ions. A positive electrode of the secondary battery 11 may be a ternary electrode that contains Ni, Mn, and Co, such as $LiNi_{1/3}Co_{1/3}Mn_{1/3}O_2$. An electrode that may be made of a composite material may be used as the electrode. The secondary battery 11 may be configured by the plurality of battery cells configuring a cell block by being connected to each other in parallel, and a plurality of the cell blocks being connected to each other in series.

As shown in FIG. 1, the information calculation system 1 according to the present embodiment can be configured by a server computer that includes a volatile storage unit 2, a non-volatile storage unit 3, a processor 4, a display 5, an interface 6, and a bus 7 that connects the foregoing components. The volatile storage unit 2 functions as a calculation area. The non-volatile storage unit 3 stores therein various programs that include sets of computer-executable instructions.

As an example, the information calculation system 1 may be configured by a server computer that belongs to an operator that is reusing the secondary battery 11. Functional units of the information calculation system 1 are configured such that a set of computer-executable instructions of a program for actualizing each function described hereafter is run using the volatile storage unit 2, the non-volatile storage unit 3, and the processor 4.

The functional units of the information calculation system 1 includes a history acquiring unit, a first degradation calculating unit, an estimated load acquiring unit, a second degradation calculating unit, and the like. The history acquiring unit acquires a battery load of a secondary battery that has been used. The first degradation calculating unit calculates, in a manner described hereafter, a first degradation state described hereafter. The estimated load acquiring unit acquires estimated load information described hereafter. The second degradation calculating unit calculates a second degradation state described hereafter.

Here, at least one of the functions of the information calculation system 1 may be configured by an electronic circuit (that is, hardware) for providing the function. Processing steps performed by the information calculation system 1 according to the present embodiment will be described hereafter with reference to a flowchart in FIG. 2.

First, at step S11, the information calculation system 1 acquires a battery load history of the secondary battery 11 that has been put to primary use. For example, the information calculation system 1 receives the battery load history of the secondary battery 11 from a battery management unit (BMU) 12 of the vehicle that is used in the primary use of the secondary battery 11, via the interface 6. As a result, the information calculation system 1 can acquire the battery load history of the secondary battery 11 without the secondary battery 11 (that is, the battery pack) being disassembled. Here, a calculation function of the BMU 12 may be imparted to an apparatus other than the vehicle, such as a data server. The data server may be used as a part of the information calculation system 1.

Here, the information calculation system 1 is merely required to be capable of acquiring the battery load history of the secondary battery 11. For example, the information calculation system 1 may perform wireless communication through the interface 6 with a vehicle that is traveling and successively store therein the battery load history of the vehicle. In addition, the information calculation system 1 may receive the battery load history of the secondary battery 11 from a facility (such as a data center) or the like that differs from the vehicle and holds the battery load history of the vehicle.

The battery load history acquired by the information calculation system 1 includes a history of loads that acts on a battery, such as a temperature, a charging/discharge current, and a usage period of the secondary battery 11. These pieces of history information are stored in the volatile storage unit 2 or the non-volatile storage unit 3 of the server computer.

Next, at step S12, the information calculation system 1 calculates first degradation states $SOHQ_a1$, $SOHQ_c1$, $SOHQ_{Li}1$, $SOHR_a1$, and $SOHR_c1$ of the secondary battery 11 at the primary use using the acquired battery load history. Here, SOH is an abbreviation of State Of Health.

$SOHQ_a1$ denotes a capacity maintenance rate of the negative electrode of the secondary battery 11 during the primary use. $SOHQ_c1$ denotes the capacity maintenance rate of the positive electrode of the secondary battery 11 during the primary use. $SOHQ_{Li}1$ denotes the capacity maintenance rate of an electrolyte of the secondary battery 11 during the primary use. $SOHR_a1$ denotes a resistance increase rate of the negative electrode of the secondary battery 11 during the primary use. $SOHR_c1$ denotes the resistance increase rate of the positive electrode of the secondary battery 11 during the primary use.

The capacity maintenance rate of each constituent element (that is, the negative electrode, the positive electrode, and the electrolyte) of the secondary battery 11 at a predetermined time (an arbitrary time after start of primary use) is a proportion of a capacity of the constituent element at the predetermined time in relation to a capacity of the constituent element of the secondary battery 11 in an initial state (such as the secondary battery 11 at factory setting). A negative electrode capacity corresponds to the number of sites on the negative electrode into which the lithium ions can be inserted. A positive electrode capacity corresponds to the number of sites on the positive electrode into which the lithium ions can be inserted.

The capacity of the electrolyte is expressed using a positive- and negative-electrode state-of-charge (SOC) deviation capacity. The positive- and negative-electrode SOC deviation capacity refers to a deviation in usage capacity range between the positive electrode and the negative electrode of the secondary battery 11. The positive- and negative-electrode SOC deviation capacity corresponds to the number of lithium ions that are capable of moving between the positive electrode and the negative electrode, and ease of movement of the overall lithium ions.

In addition, the resistance increase rate of each constituent element of the secondary battery 11 at a predetermined time (an arbitrary time after the start of primary use) is a proportion of a resistance value of the constituent element at a predetermined time in relation to a resistance value of the constituent element of the secondary battery 11 in the initial state.

Furthermore, the information calculation system 1 calculates the first degradation states $SOHQ_a1$, $SOHQ_c1$, $SOHQ_{Li}1$, $SOHR_a1$, and $SOHR_c1$ based on a plurality of degradation factors related to each battery constituent element. That is, the information calculation system 1 calculates the first degradation states $SOHQ_a1$ and $SOHR_a1$ of the negative electrode based on a plurality of degradation factors of the negative electrode of the secondary battery 11.

The information calculation system 1 calculates the first degradation states $SOHQ_c1$ and $SOHR_c1$ of the positive electrode based on a plurality of degradation factors of the positive electrode. The information calculation system 1 calculates the first degradation state $SOHQ_{Li}1$ of the electrolyte based on a plurality of degradation factors of the electrolyte.

Specifically, a negative electrode capacity $Q_a$ and a negative electrode resistance $R_a$ that are parameters of the first degradation states $SOHQ_a1$ and $SOHR_a1$ of the negative electrode are calculated taking into consideration a degradation factor that is attributed to a film being formed on a surface of the active material, a degradation factor that is attributed to the film formed on the surface of the active material cracking, and a degradation factor that is attributed to the active material itself cracking.

A positive electrode capacity $Q_c$ and a positive electrode resistance $R_c$ that are parameters of the first degradation states $SOHQ_c1$ and $SOHR_c1$ of the positive electrode are calculated taking into consideration a degradation factor that is attributed to deterioration of the surface of the active material, a degradation factor that is attributed to the deteriorated surface of the active material cracking, and a degradation factor that takes into consideration the active material itself cracking.

Furthermore, the first degradation state $SOHQ_{Li}1$ of the electrolyte is calculated taking into consideration a degradation factor that is attributed to a film being formed on the surface of the active material of the negative electrolyte, a degradation factor that is attributed to the film formed on the surface of the active material of the negative electrode cracking, and a degradation factor that is attributed to the active material itself of the negative electrode cracking, as well as a degradation factor that is attributed to a film being formed on the surface of the active material of the positive terminal, a degradation factor that is attributed to the film formed on the surface of the active material of the positive terminal cracking, and a degradation factor that is attributed to the active material itself of the positive terminal cracking.

Here, a detailed calculation method for each first degradation state will be described hereafter.

Next, at step S13, the information calculation system 1 calculates first battery states $SOHQ_B1$ and $SOHR_B1$ that are degradation states of the overall secondary battery 11 after the primary use. The first battery state $SOHQ_B1$ is calculated by a minimum value of the first degradation states $SOHQ_a1$, $SOHQ_c1$, and $SOHQ_{Li}1$ being taken. The first battery state $SOHQ_B1$ indicates the degradation state of the overall secondary battery 11 related to capacity. That is, $SOHQ_B1=\min(SOHQ_a1, SOHQ_c1, SOHQ_{Li}1)$.

As described above, the negative electrode capacity $Q_a$ corresponds to the number of sites on the negative electrode into which the lithium ions can be inserted. The positive electrode capacity $Q_c$ corresponds to the number of sites on the positive electrode into which the lithium ions can be inserted. The positive- and negative-electrode SOC deviation capacity $Q_{Li}$ corresponds to the number of lithium ions that are capable of moving between the positive electrode and the negative electrode, and the ease of movement of the overall lithium ions.

Therefore, the smallest of the negative electrode capacity $Q_a$, the positive electrode capacity $Q_c$, and the positive- and negative-electrode SOC deviation capacity $Q_{Li}$ corresponds to a battery capacity $Q_B$ of the secondary battery 11. In accompaniment, the minimum value of the first degradation states $SOHQ_a1$, $SOHQ_c1$, and $SOHQ_{Li}1$ is the first battery state $SOHQ_B1$ of the overall secondary battery 11.

In addition, the first battery state $SOHR_B1$ is calculated by a sum of the first degradation states $SOHR_a1$ and $SOHR_c1$. The first battery state $SOHR_B1$ indicates the degradation state of the overall secondary battery 11 related to resistance. That is, $SOHR_B1=SOHR_a1+SOHR_c1$. Here, for example, in the first degradation states, in a case in which the resistance of a component (such as the electrolyte) other than the electrodes (that is, the negative electrode and the positive electrode) of the secondary battery 11 is taken into consideration, the first degradation state related to the component is added to the right side of $SOHR_B1=SOHR_a1+SOHR_c1$ when the first battery state $SOHR_B1$ is calculated.

Next, at step S14, the information calculation system 1 acquires the estimated load information on a load that is estimated to act on the secondary battery 11 when the secondary battery 11 is used in a future application. That is, the information calculation system 1 acquires the load information on the load that is estimated to act on the secondary battery 11 when the secondary battery 11 after the primary use is used in another application (that is, the future application).

For example, the future application can be driving of a vehicle that requires lower performance from the secondary battery 11 than that in the primary use. When the secondary battery 11 is used for vehicle driving in the secondary use, the estimated load information can be a typical, average load that is placed on the secondary battery 11.

The estimated battery load information includes a usage frequency, a charging/discharge current value, a battery temperature, and the like of the secondary battery 11 that is estimated when the secondary battery 11 put to secondary use. These pieces of estimated load information of the secondary battery 11 are stored in the volatile storage unit 2 or the non-volatile storage unit 3 of the server computer in advance.

Next, at step S15, the information calculation system 1 calculates second degradation states $SOHQ_a2$, $SOHQ_c2$, $SOHQ_{Li}2$, $SOHR_a2$, and $SOHR_c2$ of the secondary battery 11 at the secondary use, using the acquired estimated load information. $SOHQ_a2$ denotes the capacity maintenance rate of the negative electrode of the secondary battery 11 at the secondary use. $SOHQ_c2$ denotes the capacity maintenance rate of the positive electrode of the secondary battery 11 at the secondary use. $SOHQ_{Li}2$ denotes the capacity maintenance rate of the electrolyte of the secondary battery 11 at the secondary use. $SOHR_a2$ denotes the resistance increase rate of the negative electrode of the secondary battery 11 at the secondary use. $SOHR_c2$ denotes the resistance increase rate of the positive electrode of the secondary battery 11 at the secondary use.

In addition, the information calculation system 1 calculates the second degradation states $SOHQ_a2$, $SOHQ_c2$, $SOHQ_{Li}2$, $SOHR_a2$, and $SOHR_c2$ based on a plurality of degradation factors related to each battery constituent element. That is, the information calculation system 1 calculates the second degradation states $SOHQ_a2$ and $SOHR_a2$ of the negative electrode based on a plurality of degradation factors of the negative electrode of the secondary battery 11.

The information calculation system 1 calculates the second degradation states $SOHQ_c2$ and $SOHR_c2$ of the positive electrode based on a plurality of degradation factors of the positive electrode. The information calculation system 1 calculates the second degradation state $SOHQ_{Li}2$ of the electrolyte based on the plurality of degradation factors of the electrolyte. The degradation factors of the battery constituent elements are similar to the degradation factors of the battery constituent elements at the primary use.

Next, at step S16, the information calculation system 1 calculates second battery states $SOHQ_B2$ and $SOHR_B2$ that are degradation states of the overall secondary battery 11 after the secondary use. The second battery state $SOHQ_B2$ is calculated by a minimum value of the second degradation states $SOHQ_a2$, $SOHQ_c2$, and $SOHQ_{Li}2$ being taken. The second battery state $SOHQ_B2$ indicates the degradation state of the overall secondary battery 11 related to capacity. That is, $SOHQ_B2=\min(SOHQ_a2, SOHQ_c2, SOHQ_{Li}2)$. The second battery state $SOHR_B2$ is calculated by a sum of the second degradation states $SOHR_a2$ and $SOHR_c2$. The second battery state $SOHR_B2$ indicates the degradation state of the overall secondary battery 11 related to resistance. That is, $SOHR_B2=SOHR_a2+SOHR_c2$.

Next, as shown at step S17, the information calculation system 1 calculates a value of the secondary battery 11 based on the calculated second degradation states of the secondary battery 11. The information calculation system 1 performs ranking related to the capacity of the secondary battery 11, based on the number of usage days (required number of days) required of the vehicle for secondary use, a traveling distance required of the vehicle for secondary use, and the calculated $SOHQ_B1$ and $SOHQ_B2$.

Figure 3A:
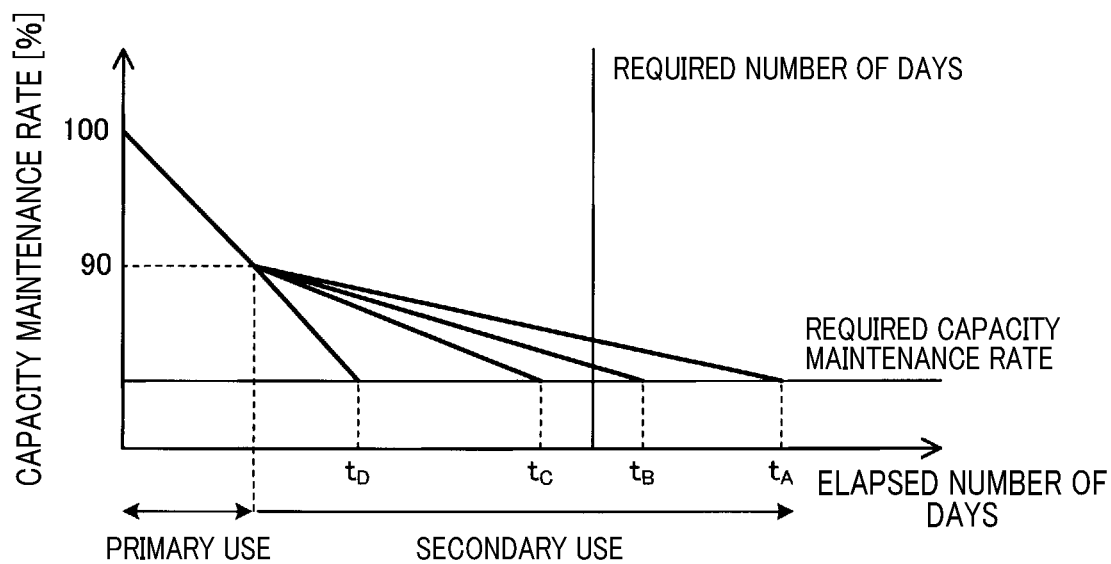
FIG. 3A is a graph of an example of a relationship between an elapsed number of days and a capacity maintenance rate.

Specifically, as shown in FIG. 3A, first, the information calculation system 1 calculates a relationship between the number of usage days and $SOHQ_B1$ related to the secondary battery 11 at the primary use. According to the present embodiment, the capacity maintenance rate of the secondary battery 11 after the primary use is 90%. Then, the information calculation system 1 calculates a relationship between the number of usage days and $SOHQ_B2$ of the secondary battery 11 when the secondary battery 11 of which the primary use has ended is put to secondary use, until the value of $SOHQ_B2$ of the secondary battery 11 reaches a required capacity maintenance rate.

In FIG. 3A, results of four patterns of secondary use of the secondary battery 11 are estimated. In the four patterns, amounts of time (referred to, hereafter, as lifetimes) from the start of secondary use until the required capacity maintenance rate of the secondary battery 11 is reached are $t_A$, $t_B$, $t_C$, and $t_D$. Here, the lifetimes $t_A$, $t_B$, $t_C$, and $t_D$ satisfy a relationship $t_A>t_B>t_C>t_D$.

Figure 3B:
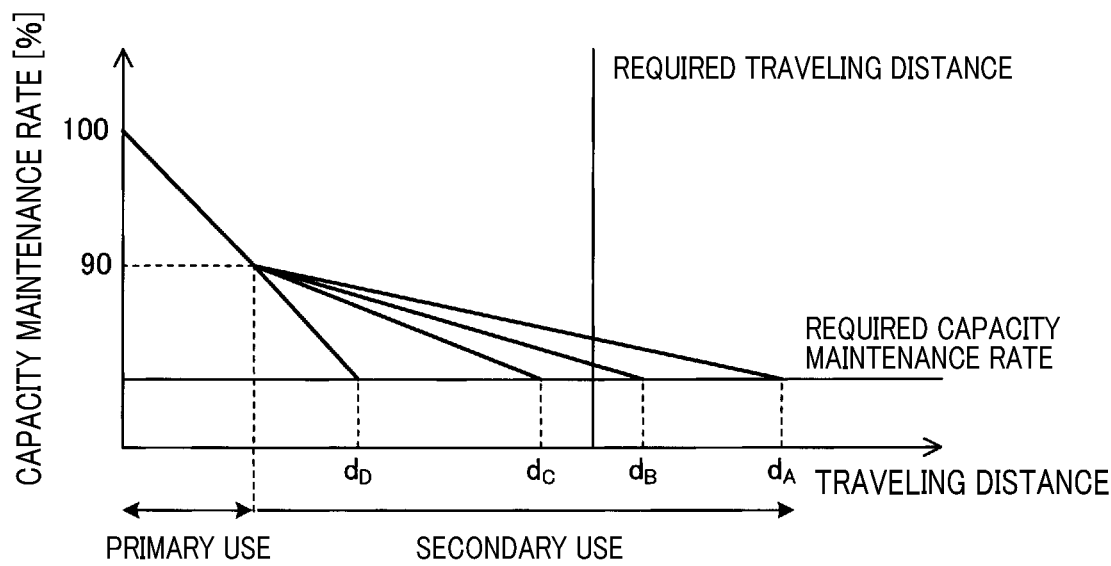
FIG. 3B is a graph of an example of a relationship between a traveling distance and the capacity maintenance rate, according to the first embodiment.

In a similar manner, as shown in FIG. 3B, the information calculation system 1 calculates a relationship between the traveling distance of the vehicle in which the secondary battery 11 is mounted at the primary use and $SOHQ_B1$. In addition, the information calculation system 1 calculates a relationship between the traveling distance of another vehicle and $SOHQ_B2$ when the secondary battery 11 of which the primary use has ended is put to secondary use in this other vehicle, until the value of $SOHQ_B2$ of the secondary battery 11 reaches the required capacity maintenance rate.

In FIG. 3B, results of four patterns of secondary use of the secondary battery 11 are estimated. In the four patterns, distances (referred to, hereafter, as lifetime traveling distances) from the start of secondary use until a required traveling distance of the secondary battery 11 is reached are $d_A$, $d_B$, $d_C$, and $d_D$. Here, the lifetime traveling distances $d_A$, $d_B$, $d_C$, and $d_D$ satisfy a relationship $d_A > d_B > d_C > d_D$.

Then, in light of both the estimation results shown in FIG. 3A and the estimation results shown in FIG. 3B, the information calculation system 1 calculates a value (referred to, hereafter, as a capacity rank) that is related to the capacity of the secondary battery 11. For example, the information calculation system 1 can determine the capacity rank using a map in which a relationship between the lifetime, the lifetime traveling distance, and the capacity rank are calculated in advance.

For example, the capacity rank becomes higher as the lifetime increases and the lifetime traveling distance increases. In a graph shown in FIG. 5, the capacity ranks are ranked using characters A to H as an example. Among the capacity ranks, A indicates the highest rank and the ranks decrease in alphabetical order.

Next, at step S18, the information calculation system 1 performs ranking related to the resistance of the secondary battery 11, based on the number of usage days (required number of days) required of the vehicle for secondary use, the traveling distance required of the vehicle for secondary use, and the calculated $SOHR_B1$ and $SOHR_B2$.

Figure 4A:
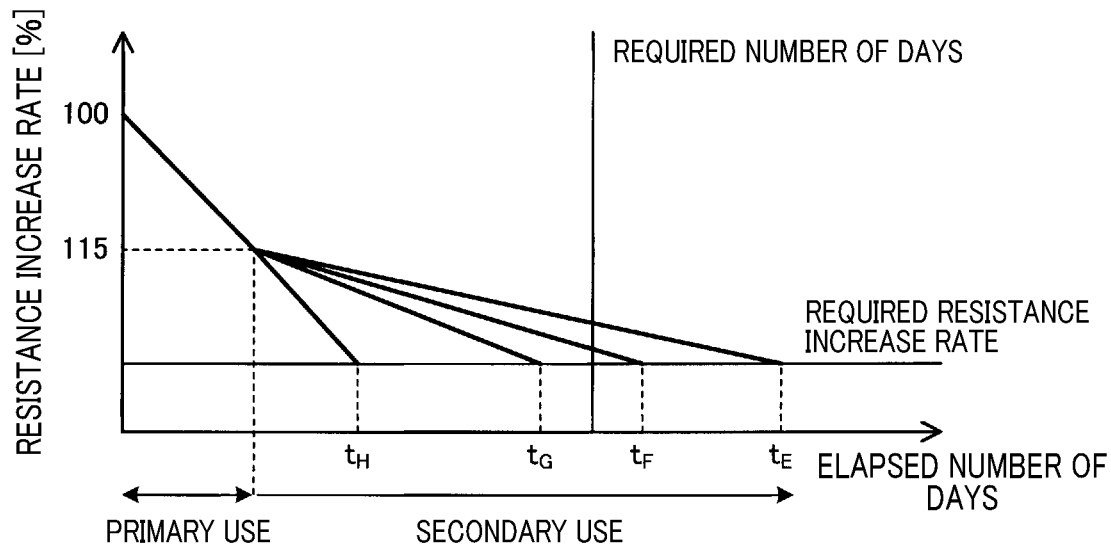
FIG. 4A is a graph of an example of a relationship between the elapsed number of days and a resistance increase rate.

Specifically, as shown in FIG. 4A, first, the information calculation system 1 calculates a relationship between the number of usage days and $SOHR_B1$ related to the secondary battery 11 at primary use. Here, in FIG. 4A and FIG. 4B, the resistance increase rate increases (that is, a degree of degradation increases) towards a lower side of a vertical axis $SOHR_B1$. The resistance increase rate of the secondary battery 11 after the primary use is 115%.

In addition, the information calculation system 1 calculates a relationship between the number of usage days and $SOHR_B2$ of the secondary battery 11 when the secondary battery 11 of which the primary use has ended is put to secondary use, until the value of $SOHR_B2$ of the secondary battery 11 reaches a required resistance increase rate. In FIG. 4A, results of four patterns of secondary use of the secondary battery 11 are estimated. In the four patterns, the lifetimes are $t_E$, $t_F$, $t_G$, and $t_H$. Here, the lifetimes $t_E$, $t_F$, $t_G$, and $t_H$ satisfy a relationship $t_E > t_F > t_G > t_H$.

Figure 4B:
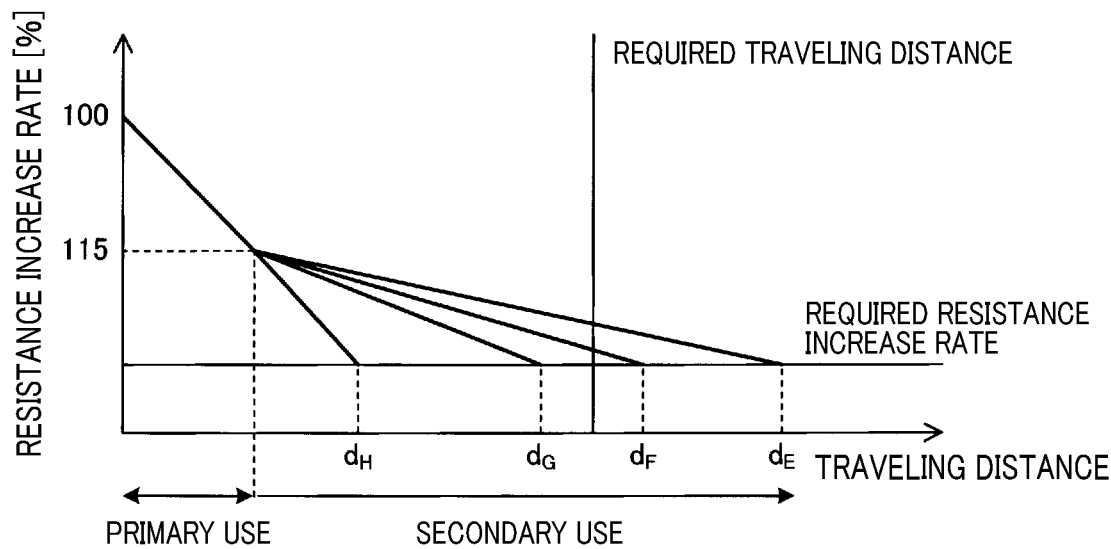
FIG. 4B is a graph of an example of a relationship between the traveling distance and the resistance increase rate, according to the first embodiment.

In a similar manner, as shown in FIG. 4B, the information calculation system 1 calculates a relationship between the traveling distance of the vehicle in which the secondary battery 11 is mounted at the primary use and $SOHR_B1$. In addition, the information calculation system 1 calculate a relationship between the traveling distance of another vehicle and $SOHR_B2$ when the secondary battery 11 of which the primary use has ended is put to secondary use in this other vehicle, until the value of $SOHR_B2$ of the secondary battery 11 reaches the required resistance increase rate.

In FIG. 4B, results of four patterns of secondary use of the secondary battery 11 are estimated. In the four patterns, the lifetime traveling distances are $d_E$, $d_F$, $d_G$, and $d_H$. Here, the lifetime traveling distances $d_E$, $d_F$, $d_G$, and du satisfy a relationship $d_E > d_F > d_G > d_H$.

Then, in light of both the estimation results shown in FIG. 4A and the estimation results shown in FIG. 4B, the information calculation system 1 calculates a value (referred to, hereafter, as a resistance rank) that is related to the resistance of the secondary battery 11.

For example, the information calculation system 1 can determine the resistance rank using a map in which a relationship between the lifetime, the lifetime traveling distance, and the resistance rank are calculated in advance. The resistance rank becomes higher as the lifetime increases and the lifetime traveling distance increases. In the graph shown in FIG. 5, the resistance ranks are ranked using characters A to H as an example. Among the resistance ranks, A indicates the highest rank and the ranks decrease in alphabetical order.

Then, at step S19, as shown in FIG. 5, in light of both the capacity rank and the resistance rank, the information calculation system 1 calculates the residual value of the secondary battery 11 when the used secondary battery 11 after the primary use is used in the assumed application for secondary use.

As shown in FIG. 5, the residual value of the secondary battery 11 increases as the capacity rank increases and the resistance rank increases. In addition, when the capacity rank or the resistance rank is the lowest rank H, the information calculation system 1 determines that the secondary battery 11 cannot be put to secondary use. The secondary battery 11 is recycled (that is, the secondary battery 11 is disassembled and each section is recycled) or discarded.

Furthermore, at step S10, for example, the information calculation system 1 outputs an evaluation result of the secondary battery 11 to the server computer that configures the information calculation system 1 (for example, the evaluation result is displayed in the display 5 or printed).

As described above, the information calculation system 1 according to the present embodiment is capable of calculating the residual value of the secondary battery 11 when the secondary battery 11 is reused. Here, the residual value of the secondary battery 11 that takes into consideration other applications (such as power supply for housing) as the secondary use can also be calculated. In this case, the estimated load information acquired by the information calculation system 1 is changed. When the secondary battery 11 is put to secondary use in power supply for housing, the estimated load information can be that of a typical, average load that is applied to the secondary battery 11 when the secondary battery 11 is used in housing.

In addition, if the application for secondary use changes, the performance required of the secondary battery 11 may also change. Therefore, when the application for secondary use is changed and the residual value of the secondary battery 11 is calculated, the evaluation of the residual value of the secondary battery 11 may also change. For example, even if the secondary battery 11 is evaluated as being unusable for vehicle driving, the secondary battery 11 may be evaluated as being usable in housing.

Figure 6:
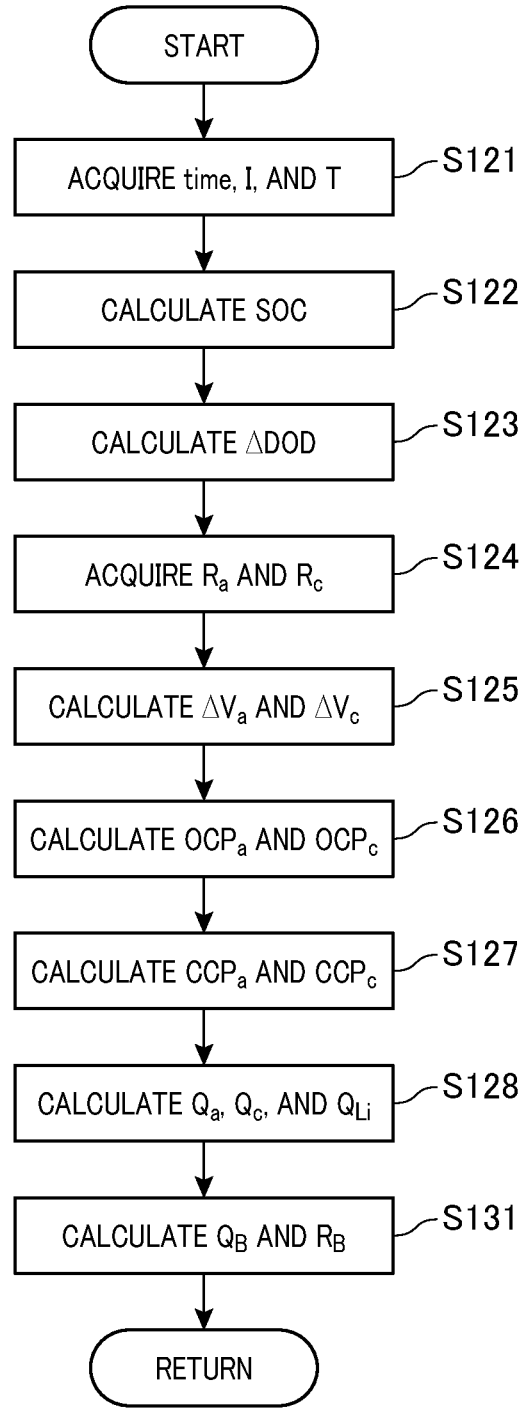
FIG. 6 is a flowchart for explaining a process for calculating first battery states $Q_B$ and $R_B$, according to the first embodiment.

Next, details of step S12, that is, the process in which the information calculation system 1 calculates the first degradation states $SOHQ_a1$, $SOHQ_c1$, $SOHQ_{Li}1$, $SOHR_a1$, and $SOHR_c1$ will be described with reference to FIG. 6 to FIG. 8.

The information calculation system 1 successively calculates the first degradation state of the secondary battery 11 from start to end of the primary use, based on the battery load history of the secondary battery 11. Hereafter, a start time of a single calculation operation for the first degradation state is $t_s$, an end time is $t_c$, and an amount of time from the start time $t_s$ to the end time $t_c$ is referred to as an execution cycle. For example, when the execution cycle is a short period such as one second, the accuracy of prediction of the first degradation state is easily improved. However, calculation load increases. Meanwhile, when the execution cycle is a long period, improvement in the accuracy of capacity prediction becomes difficult. However, calculation load decreases. The execution cycle can be determined as appropriate taking the foregoing into consideration.

At step S121, based on a distribution of temperatures of the secondary battery 11 during the execution cycle, the information calculation system 1 calculates a temperature T of the secondary battery 11 in the execution cycle. For example, the temperature T can be an average value that is calculated from a frequency distribution of the temperatures of the secondary battery 11 that are acquired during the execution cycle. Here, to reduce calculation load, an average value of the temperatures of the secondary battery 11 acquired during the execution cycle or the like can be used as the temperature T. The temperature T is stored in the volatile storage unit 2 or the non-volatile storage unit 3 of the information calculation system 1.

In addition, at step S121, based on a distribution of current values of the secondary battery 11 during the execution cycle, the information calculation system 1 calculates a current value I of the secondary battery 11 in the execution cycle. For example, the current value I can be an average value that is calculated from a frequency distribution of the current values of the secondary battery 11 that are acquired during the execution cycle. Here, to reduce calculation load, an average value of the current values of the secondary battery 11 acquired during the execution cycle or the like can be used as the current value I. The temperature T and the current value I are stored in the volatile storage unit 2 or the non-volatile storage unit 3 of the information calculation system 1.

Next, at step S122, the information calculation system 1 calculates an integrated value of the current values of the secondary battery 11 and calculates a charging state of the secondary battery 11 based on the integrated value. The charging state is the so-called SOC and expresses a ratio of a remaining capacity to a fully-charged capacity of the secondary battery 11 in percentages. Hereafter, the charging state of the secondary battery 11 is referred to as the SOC. For example, the information calculation system 1 can use a current integration method and calculate the SOC of the secondary battery 11 based on the integrated value of the secondary battery 11.

Next, at step S123, the information calculation system 1 calculates $\Delta DOD$. $\Delta DOD$ is calculated by a difference between the SOC at the start time $t_s$ and the SOC at the end time $t_c$ of the execution cycle. Here, DOD is an abbreviation of Depth Of Discharge that indicates a depth of discharge of the secondary battery 11.

Next, at step S124, the information calculation system 1 calculates each of the negative electrode resistance $R_a$ and the positive electrode resistance $R_c$ of the secondary battery 11. The information calculation system 1 calculates the negative electrode resistance $R_a$ and the positive electrode resistance $R_c$ of the secondary battery 11 based on the temperature T of the secondary battery 11, the current value I of the secondary battery 11, the amount of change $\Delta DOD$ in the SOC, and a closed circuit potential of the negative electrode or a closed circuit potential of the positive electrode of the secondary battery 11.

Here, the temperature T is the temperature T of the secondary battery 11 calculated at step S121. The current value I is the current value I of the secondary battery 11 calculated at step S121. The amount of change $\Delta DOD$ is $\Delta DOD$ calculated at step S123.

The closed circuit potential of the negative electrode and the closed circuit potential of the positive electrode of the secondary battery 11 are the closed circuit potentials of the negative electrode and the positive electrode of the secondary battery 11 calculated in a previous execution cycle. Here, the closed circuit potential of the negative electrode of the secondary battery 11 is referred to, hereafter, as $CCP_a$. The closed circuit potential of the positive electrode of the secondary battery 11 is referred to as $CCP_c$. CCP is an abbreviation of Closed Circuit Potential.

The negative electrode resistance $R_a$ can be expressed as functions of the temperature T, the $CCP_a$, the amount of change $\Delta DOD$, and the charging/discharge current value I of the secondary battery 11. The positive electrode resistance $R_c$ can be expressed as functions of the temperature T, the $CCP_c$, the amount of change $\Delta DOD$, and the charging/discharge current value I of the secondary battery 11. This will be described below.

First, the negative electrode resistance $R_a$ will be described.

The negative electrode resistance $R_a$ increases as a result of a film (solid electrolyte interface [SEI]) being formed on the negative electrode surface as a result of oxidation-reduction (redox) decomposition of the electrolyte and additives thereof in the secondary battery 11. The film is produced as a result of the above-described chemical reaction. Thus, the negative electrode resistance $R_a$ follows the Arrhenius equation. Therefore, the negative electrode resistance $R_a$ can be expressed by a function of the temperature T.

In addition, the film formation on the negative electrode surface is attributed to oxidation and reduction. Thus, the negative electrode resistance $R_a$ follows the Tafel equation. Therefore, the negative electrode resistance $R_a$ can be expressed by a function of the negative electrode potential $CCP_a$.

Furthermore, as a result of a charging/discharge cycle of the secondary battery 11 being repeated, the active material in the negative electrode is repeatedly expanded and contracted. Cracking of the surface film progresses, and the negative electrode surface is eventually exposed from a crack in the film. As a result of a new film being formed on the exposed surface, an amount of film increases, causing further increase in the negative electrode resistance $R_a$. In addition, as $\Delta DOD$ increases, a degree of expansion and contraction of the active material increases. Therefore, the negative electrode resistance $R_a$ can be expressed by a function of $\Delta DOD$.

In addition, in the negative electrode, as a result of the expansion and contraction of the active material being repeated as described above, the active material itself cracks and decreases in diameter. Cracking of the active material itself is both a factor in reducing the negative electrode resistance $R_a$ and a factor in increasing the negative electrode resistance $R_a$. First, as a result of the cracking of the active material itself, a new surface (that is, a surface on which the film is not formed) is formed on the active material. Consequently, a reaction surface increases. Therefore, cracking of the active material itself is a factor in reducing the negative electrode resistance $R_a$.

Meanwhile, when the new surface is formed on the active material, film formation is promoted on the new surface. Therefore, the amount of film increases and the negative electrode resistance $R_a$ increases. Taking the foregoing into consideration, the negative electrode resistance $R_a$ can be expressed by a function of ΔDOD based on a theory described below.

A pulverization speed that is a speed of cracking of the active material in the negative electrode is expressed by dr/dt, where a particle diameter of the active material is r and time is t. Here, the pulverization speed dr/dt is considered to progress more easily as the particle diameter r of the active material increases. That is, the pulverization speed dr/dt is thought to be proportional to the particle diameter r of the active material. Therefore, the pulverization speed can be expressed as in expression (1), below.

$$\frac{dr}{dt} = -k \times r \tag{1}$$

Here, in expression (1), above, k is a constant and may be referred to, hereafter, as a pulverization constant. When expression (1) is solved, a solution such as expression (2), below, is obtained.

$$\ln(r) = -k \times t + a \tag{2}$$

Here, in expression (2), above, a is a constant.

Furthermore, in the active material, the degree of expansion and contraction of the active material increases as ΔDOD increases. Therefore, the pulverization constant is thought to be proportional to ΔDOD. In this case, expression (3), below, is established.

$$\ln(k) = \beta \times \Delta DOD + \gamma \tag{3}$$

Here, in expression (3), above, β and γ are constants. When expression (3) is solved, a solution such as expression (4), below, is obtained.

$$k = \eta \times \exp(\zeta \times \Delta DOD) \tag{4}$$

Here, in expression (4), above, η and ζ are constants. Then, when expression (2) and expression (4), above, are coupled, expression (5), below, can be derived.

$$r(t, \Delta DOD) = r_0 \{1 - A \times \exp[B \times \langle \exp(C \times \Delta DOD) \rangle \times t]\} \tag{5}$$

$$f(t, \Delta DOD) = A \times \exp[B \times \langle \exp(C \times \Delta DOD) \rangle \times t] \tag{6}$$

Here, $r_0$ is an initial (that is, at t=0) radius of the active material. A, B, and C are constants. As described above, the negative electrode resistance $R_a$ increases as a result of the film being formed on the negative electrode surface. A formation speed of the film on the negative electrode surface is correlated with the diameter of the active material of the negative electrode. Therefore, the negative electrode resistance $R_a$ can be expressed by an expression that includes a pulverization function f (t, ΔDOD), that is, a function of ΔDOD. Here, regarding terms inside the parentheses on the right side of expression (5), addition and correction using constants may further be performed. In addition, the constants A, B, and C are learned as described hereafter.

In addition, cracking of the surface film of the negative electrode and cracking of the active material itself of the negative electrode, described above, are also dependent on the charging/discharge current of the secondary battery 11. That is, the current tends to flow in a concentrated manner through a low resistance portion of the active material as the charging/discharge current value increases. Therefore, a difference in the degree of expansion and contraction may occur between portions of the active material. As a result, strain easily occurs in the active material, causing cracking of the surface film on the negative electrode and cracking of the active material itself of the negative electrode.

Therefore, cracking of the surface film on the negative electrode and cracking of the active material itself of the negative electrode can be expressed by a function of the charging/discharge current value I or a function of C-rate that is correlated with the charging/discharge current value I. Here, C-rate indicates a current at which a battery can be fully charged to or fully discharged from a rated capacity in one hour, when constant-current charging/discharge measurement is performed.

In summary, the negative electrode resistance $R_a$ can be expressed as in expression (7), below, using a function $g_A(T, CCP_a)$ that takes into consideration the film being formed on the surface of the active material, a function $g_B(T, CCP_a, \Delta DOD, I)$ that takes into consideration the film formed on the surface of the active material cracking, and a function $g_C(T, CCP_a, \Delta DOD, I)$ that takes into consideration the active material itself cracking.

$$R_a = g_A(T, CCP_a) \times g_B(T, CCP_a, \Delta DOD, I) \times g_C(T, CCP_a, \Delta DOD, I) \tag{7}$$

Based on a theory such as that above, the negative electrode resistance $R_a$ is expressed by the functions of the temperature T, $CCP_a$, the amount of change ΔDOD, and the charging/discharge current value I of the secondary battery 11.

Next, the positive electrode resistance $R_c$ will be described.

The positive electrode resistance $R_c$ increases in accompaniment with deterioration of the positive electrode surface. The positive electrode surface deteriorates as a result of chemical reaction. Thus, the positive electrode resistance $R_c$ follows the Arrhenius equation. Therefore, the positive electrode resistance $R_c$ can be expressed by a function of the temperature T.

In addition, the deterioration of the positive electrode surface is attributed to reductive decomposition of the positive electrode surface. Thus, the positive electrode resistance $R_c$ follows the Tafel equation. Therefore, the positive electrode resistance $R_c$ can be expressed by a function of $CCP_c$.

Furthermore, as a result of the charging/discharge cycle of the secondary battery 11 being repeated, the active material in the positive electrode is repeatedly expanded and contracted. Cracking occurs in the deteriorated surface of the active material of the positive electrode, and a new, undeteriorated positive electrode surface is formed. The new positive electrode surface eventually deteriorates, causing further increase in the positive electrode resistance $R_c$. In addition, as ΔDOD increases, the degree of expansion and contraction of the active material increases. Therefore, the positive electrode resistance $R_c$ can be expressed by a function of ΔDOD.

In addition, the deterioration of the positive electrode surface is promoted by the expansion and contraction of the active material of the positive electrode being repeated, cracking of the active material of the positive electrode progressing, and the diameter of the active material decreasing. Cracking of the active material itself is both a factor in reducing the positive electrode resistance $R_c$ and a factor in increasing the positive electrode resistance $R_c$.

First, as a result of the cracking of the active material itself, a new surface (that is, a surface before deterioration) is formed on the active material. Therefore, cracking of the active material itself is a factor in reducing the positive electrode resistance $R_c$. Meanwhile, when a new surface is formed on the active material, the new surface eventually deteriorates and the positive electrode resistance $R_c$ increases.

Taking the foregoing into consideration, the positive electrode resistance $R_c$ can be expressed by an expression that includes the pulverization function f (t, $\Delta$DOD) in expression (6), above, that is, a function of $\Delta$DOD, based on a theory that is similar to that of the negative electrode resistance $R_a$.

In addition, cracking of the active material itself of the positive electrode, described above, is also dependent on the charging/discharge current value I. That is, the current tends to flow in a concentrated manner through a low resistance portion of the active material as the charging/discharge current value I increases. Therefore, a difference in the degree of expansion and contraction may occur between portions of the active material.

As a result, strain easily occurs in the active material, causing cracking of the active material itself of the positive electrode. Therefore, cracking of the active material itself of the positive electrode can be expressed by a function of the charging/discharge current value I or a function of C-rate that is correlated with the charging/discharge current value I.

In summary, the positive electrode resistance $R_c$ can be expressed as in expression (8), below, using a function $h_A(T, CCP_c)$ that takes into consideration the deterioration of the surface of the active material, a function $h_B(T, CCP_c, \Delta DOD, I)$ that takes into consideration the deteriorated surface of the active material cracking, and a function $h_C(T, CCP_c, \Delta DOD, I)$ that takes into consideration the active material itself cracking.

$$R_c = h_A(T, CCP_c) \times h_B(T, CCP_c, \Delta DOD, I) \times h_C(T, CCP_c, \Delta DOD, I) \quad (8)$$

Based on a theory such as that above, the positive electrode resistance $R_c$ is expressed by the functions of the temperature T, $CCP_c$, the amount of change $\Delta$DOD, and the charging/discharge current value I of the secondary battery 11.

Here, regarding $CCP_a$ and $CCP_c$ that are used at step S124, the information calculation system 1 uses $CCP_a$ and $CCP_c$ that are calculated at step S128, described hereafter, in the execution cycle before the current execution cycle. Here, when $CCP_a$ and $CCP_c$ that are calculated in the previous execution cycle are not present (such as at system startup), initial $CCP_a$ and $CCP_c$ are calculated in a following manner.

First, initial polarization $\Delta V_a$ of the negative electrode is calculated from a product of the current value I calculated at step S121 and an initial value, described hereafter, of the negative electrode resistance $R_a$. Initial polarization $\Delta V_c$ of the positive electrode is calculated from a product of the current value I calculated at step S121 and an initial value of the positive electrode resistance $R_c$.

For example, the initial value of the negative electrode resistance $R_a$ and the initial value of the positive electrode resistance $R_c$ are a negative electrode resistance and a positive electrode resistance of the secondary battery 11 in an initial state (such as a factory setting state of the secondary battery 11), the secondary battery 11 being a same type as the secondary battery 11 according to the present embodiment. For example, the initial values of the negative electrode resistance $R_a$ and the positive electrode resistance $R_c$ of the secondary battery 11 are held in the BMU 12 and can be acquired from the BMU 12.

For example, the negative electrode resistance $R_a$ and the positive electrode resistance $R_c$ in the initial state can be determined by an alternating-current impedance method or current-voltage (I-V) measurement. Alternatively, the negative electrode resistance $R_a$ and the positive electrode resistance $R_c$ in the initial state can be determined by a half cell in which a positive electrode of a disassembled secondary battery 11 in the initial state is used and a half cell in which a negative electrode of the disassembled secondary battery 11 is used being fabricated, and resistance measurement of each half cell being performed.

In addition, open circuit potentials of the negative electrode and the positive electrode are calculated based on initial OCP characteristics, described hereafter, and the SOC calculated at step S122. The open circuit potentials are the potentials at the electrodes of the secondary battery 11 when a state in which energization between the secondary battery 11 and an external circuit has not been performed has continued for a long period of time.

The open circuit potential of the negative electrode of the secondary battery 11 is referred to, hereafter, as $OCP_a$. The open circuit potential of the positive electrode of the secondary battery 11 is referred to as $OCP_c$. OCP is an abbreviation of Open Circuit Potential. The initial OCP characteristics indicate a relationship between the SOC and $OCP_a$, and a relationship between the SOC and $OCP_c$ of the secondary battery 11 in the initial state. For example, the initial OCP characteristics are stored in the BMU 12. Next, $CCP_a$ is obtained by $OCP_a + \Delta V_a$ being calculated. $CCP_c$ is obtained by $OCP_c + \Delta V_c$ being calculated.

As described above, when $CCP_a$ and $CCP_c$ that are calculated in the previous execution cycle are not present (such as when no previous execution cycle is present in the first place, such as at system startup), the initial $CCP_a$ and $CCP_c$ are calculated.

Next, at step S125, the information calculation system 1 calculates the polarization $\Delta V_a = I \times R_a$ of the negative electrode and the polarization $\Delta V_c = I \times R_c$ of the positive electrode. I is the current value I of the secondary battery 11 calculated at step S121. $R_a$ and $R_c$ are respectively the negative electrode resistance $R_a$ and the positive electrode resistance $R_c$ calculated at step S124.

At step S126, the information calculation system 1 calculates $OCP_a$ and $OCP_c$. The information calculation system 1 calculates the $OCP_a$ and $OCP_c$ based on the SOC of the secondary battery 11 calculated at step S122 and updated OCP characteristics in the previous execution cycle stored in the BMU 12. The updated OCP characteristics indicate a relationship between the SOC and $OCP_a$, and a relationship between the SOC and $OCP_c$ of the secondary battery 11 after degradation.

Here, the updated OCP characteristics can be acquired in a following manner. First, the initial OCP characteristics stored in the volatile storage unit 2 or the non-volatile storage unit 3 of the information calculation system 1 in advance are updated based on the negative electrode capacity $Q_a$, the positive electrode capacity $Q_c$, and the positive- and negative-electrode SOC deviation capacity $Q_{Li}$ calculated at step S128, described hereafter. The initial OCP characteristics indicate the relationship between the SOC and $OCP_a$, and the relationship between the SOC and $OCP_c$ of the secondary battery 11 in the initial state. A method for updating the initial OCP characteristics is not particularly limited. For example, a publicly known method can be used.

At step S127, the information calculation system 1 calculates $CCP_a$ and $CCP_c$ of the secondary battery 11. The information calculation system 1 acquires $\Delta V_a$ and $\Delta V_c$ that are calculated at step S125. In addition, the information calculation system 1 acquires $OCP_a$ and $OCP_c$ calculated at step S126. Then, the information calculation system 1 calculates $CCP_a$ from $OCP_a$ by using the expression $CCP_a = OCP_a + \Delta V_a$, and calculates $CCP_c$ from $OCP_c$ by using the expression $CCP_c = OCP_c + \Delta V_c$.

Here, in the secondary battery 11, polarization becomes apparent as a result of degradation. That is, as a result of the occurrence of polarization, a closed circuit voltage of the secondary battery 11 increases during charging of the secondary battery 11 and decreases during discharge. However, when degradation progresses, the closed circuit voltage further increases during charging of the secondary battery 11 and further decreases during discharge.

Figure 7A:
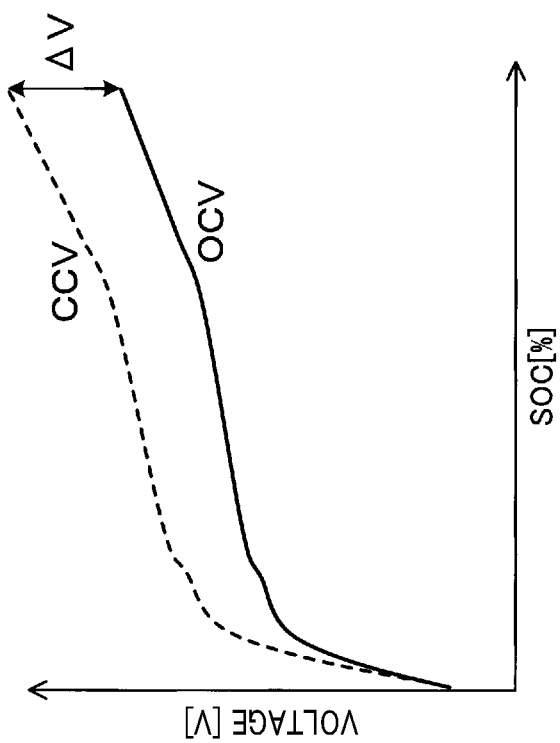
FIG. 7A is a diagram schematically showing a relationship between an open circuit voltage and a charging rate, and a relationship between a closed circuit voltage and the charging rate of the secondary battery before degradation.
Figure 7B:
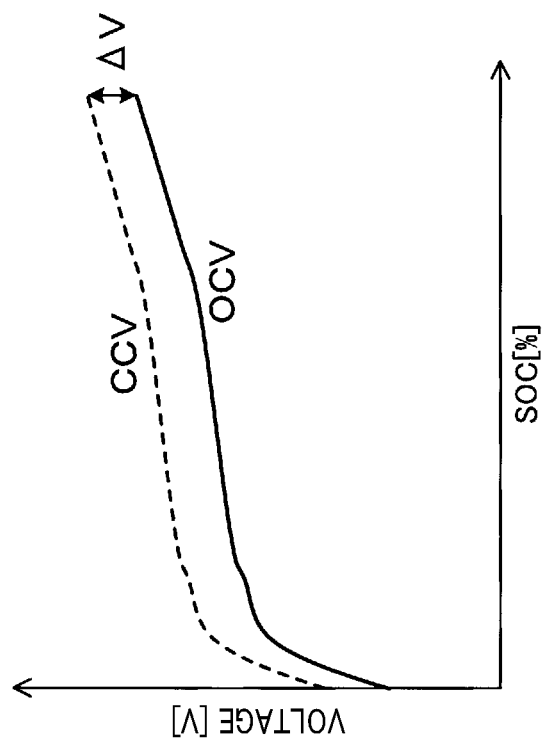
FIG. 7B is a diagram schematically showing a relationship between the open circuit voltage and the charging rate, and a relationship between the closed circuit voltage and the charging rate of the secondary battery after degradation, according to the first embodiment.

For example, FIG. 7A schematically shows a relationship between the SOC and the voltage during charging of the secondary battery 11 before degradation. FIG. 7B schematically shows a relationship between the SOC and the voltage during charging of the secondary battery 11 after degradation. In FIG. 7A and FIG. 7B, an open circuit voltage is indicated by a solid line and the closed circuit voltage is indicated by a broken line. The scale of the voltage on the vertical axis coincides between FIG. 7A and FIG. 7B. The open circuit voltage is referred to, hereafter, as OCV. The closed circuit voltage is referred to as CCV. OCV is an abbreviation of Open Circuit Voltage. CCV is an abbreviation of Closed Circuit Voltage.

From FIG. 7A and FIG. 7B, it is clear that the polarization $\Delta V$ of the secondary battery 11 after degradation is greater than that before degradation. In light of this issue, to predict the degradation of the secondary battery 11, the information calculation system 1 according to the present embodiment uses CCP instead of OCP in which polarization $\Delta V$ is taken into consideration, and predicts the battery capacity $Q_B$ using this CCP.

Next, at step S128, the information calculation system 1 calculates the negative electrode capacity $Q_a$, the positive electrode capacity $Q_c$, and the positive- and negative-electrode SOC deviation capacity $Q_{Li}$ of the secondary battery 11. The information calculation system 1 acquires $CCP_a$ and the $CCP_c$ calculated at step S127, the temperature T of the secondary battery 11 calculated at step S121, and $\Delta DOD$ calculated at step S123.

The information calculation system 1 calculates the negative electrode capacity $Q_a$, the positive electrode capacity $Q_c$, and the positive- and negative-electrode SOC deviation capacity $Q_{Li}$ of the secondary battery 11 based on at least either of $CCP_a$ and $CCP_c$, the temperature T of the secondary battery 11, the current value I of the secondary battery 11, and $\Delta DOD$.

The information calculation system 1 expresses the negative electrode capacity $Q_a$ based on a theory similar to that for calculating the negative electrode resistance $R_a$. That is, the negative electrode capacity $Q_a$ can be expressed as in expression (9), below, using a function $i_A(T, CCP_a)$ that takes into consideration the film being formed on the surface of the active material, a function $i_B(T, CCP_a, \Delta DOD, I)$ that takes into consideration the film formed on the surface of the active material cracking, and a function is $(T, CCP_a, \Delta DOD, I)$ that takes into consideration the active material itself cracking. That is, the negative electrode capacity $Q_a$ can be expressed by functions of the temperature T, $CCP_a$, the amount of change $\Delta DOD$ (that is, the pulverization function $f(t, \Delta DOD)$), and the charging/discharge current value I of the secondary battery 11.

$$Q_a = i_A(T, CCP_a) \times i_B(T, CCP_a, \Delta DOD, I) \times i_C(T, CCP_a, \Delta DOD, I) \qquad (9)$$

In addition, the information calculation system 1 expresses the positive electrode capacity $Q_c$ based on a theory similar to that for calculating the positive electrode resistance $R_c$. That is, the positive electrode capacity $Q_c$ can be expressed as in expression (10), below, using a function $j_A(T, CCP_c)$ that takes into consideration deterioration of the surface of the active material, a function $j_B(T, CCP_c, \Delta DOD, I)$ that takes into consideration the deteriorated surface of the active material cracking, and a function $j_C(T, CCP_c, \Delta DOD, I)$ that takes into consideration the active material itself cracking. That is, the positive electrode capacity $Q_C$ can be expressed by functions of the temperature T, $CCP_c$, the amount of change $\Delta DOD$, that is, the pulverization function $f(t, \Delta DOD)$, and the charging/discharge current value I of the secondary battery 11.

$$Q_c = j_A(T, CCP_c) \times j_B(T, CCP_c, \Delta DOD, I) \times j_C(T, CCP_c, \Delta DOD, I) \qquad (10)$$

The positive- and negative-electrode SOC deviation capacity $Q_{Li}$ is correlated with consumption of lithium ion as a result of formation of the films (solid electrolyte interface [SD]) on the negative electrode and the positive electrode. This consumption of lithium ions is a chemical reaction. The positive- and negative-electrode SOC deviation capacity $Q_{Li}$ follows the Arrhenius equation. Therefore, positive- and negative-electrode SOC deviation capacity $Q_{Li}$ can be expressed by a function of the temperature T.

The consumption of lithium ions as a result of film formation on the negative electrode and the positive electrode is an oxidation-reduction reaction. Thus, the positive- and negative-electrode SOC deviation capacity $Q_{Li}$ follows the Tafel equation. Therefore, the positive- and negative-electrode SOC deviation capacity $Q_{Li}$ can be expressed by a function of $CCP_a$ and $CCP_c$.

In addition, as a result of the charging/discharge cycle of the secondary battery 11 being repeated, the active material in each of the electrodes (that is, the negative electrode and the positive electrode) is repeatedly expanded and contracted. Cracking of the surface film on the active material of the electrode progresses. As a result, the electrode surface is exposed from cracks in the film. As a result of a new film being formed on the exposed surface, an amount of consumption of lithium ions increases. In addition, as $\Delta DOD$ increases, the degree of expansion and contraction of the active material increases. Therefore, the positive- and negative-electrode SOC deviation capacity $Q_{Li}$ can be expressed by a function of $\Delta DOD$.

Furthermore, in each of the electrodes, as a result of the expansion and contraction of the active material being repeated as described above, the active material itself cracks and decreases in diameter. Cracking of the active material itself is both a factor in increasing the positive- and negative-electrode SOC deviation capacity $Q_{Li}$ and a factor in reducing the positive- and negative-electrode SOC deviation capacity $Q_{Li}$.

In addition, as a result of the cracking of the active material itself, a new surface (that is, a surface on which the film is not formed) is formed on the active material. Therefore, the lithium ions are more easily able to move to the active materials of the electrodes, thereby becoming a factor in increasing the positive- and negative-electrode SOC deviation capacity $Q_{Li}$.

Meanwhile, when the new surface is formed on the active material, film formation is promoted on the new surface and the lithium ions are consumed, thereby becoming a factor in reducing the positive- and negative-electrode SOC deviation capacity $Q_{Li}$. Taking the foregoing into consideration, the positive- and negative-electrode SOC deviation capacity $Q_{Li}$ can be expressed by an expression that includes the pulverization function f (t, $\Delta$DOD), that is, a function of $\Delta$DOD, based on a theory that is similar to that of the negative electrode resistance $R_a$ and the positive electrode resistance $R_c$.

In addition, cracking of the active material itself of each of the electrodes, described above, is also dependent on the charging/discharge current value I. That is, the current tends to flow in a concentrated manner through a low resistance portion of the active material as the charging/discharge current value I increases. Therefore, a difference in the degree of expansion and contraction may occur between portions of the active material.

As a result, strain easily occurs in the active material, causing cracking of the active material itself. Therefore, cracking of the active material itself of each of the electrodes can be expressed by a function of the charging/discharge current value I or a function of C-rate that is correlated with the charging/discharge current value I.

In summary, the positive- and negative-electrode SOC deviation capacity $Q_{Li}$ can be expressed as in expression (11), below, using a function $k_A$(T, $CCP_a$) that takes into consideration the film being formed on the surface of the active material of the negative electrode, a function $k_B$(T, $CCP_a$, $\Delta$DOD, I) that takes into consideration the film formed on the surface of the active material of the negative electrode cracking, and a function $k_C$(T, $CCP_a$, $\Delta$DOD, I) that takes into consideration the active material itself of the negative electrode cracking, as well as a function $l_A$(T, $CCP_c$) that takes into consideration the film being formed on the surface of the active material of the positive electrode, a function $l_B$(T, $CCP_c$, $\Delta$DOD, I) that takes into consideration the film formed on the surface of the active material of the positive electrode cracking, and a function $l_C$(T, $CCP_c$, $\Delta$DOD, I) that takes into consideration the active material itself of the positive electrode cracking.

$$Q_{Li}=k_A(T,CCP_a)\times k_B(T,CCP_a,\Delta DOD,I)\times k_C(T,CCP_a,\Delta DOD,I)+l_A(T,CCP_c)\times l_B(T,CCP_c,\Delta DOD,I)\times l_C(T,CCP_c,\Delta DOD,I) \quad (11)$$

As described above, the positive- and negative-electrode SOC deviation capacity $Q_{Li}$ can be expressed by the functions of the temperature T, $CCP_a$, $CCP_c$, the amount of change $\Delta$DOD, and the charging/discharge current value I of the secondary battery 11.

At step S131, the information calculation system 1 determines the battery capacity $Q_B$ based on $Q_B$=min ($Q_a$, $Q_c$, $Q_{Li}$). That is, the information calculation system 1 determines the smallest of the negative electrode capacity $Q_a$, the positive electrode capacity $Q_c$, and the positive- and negative-electrode SOC deviation capacity $Q_{Li}$ to be the battery capacity (that is, a full-charge capacity) of the secondary battery 11.

As described above, the negative electrode capacity $Q_a$ corresponds to the number of sites on the negative electrode into which the lithium ions can be inserted. The positive electrode capacity $Q_c$ corresponds to the number of sites on the positive electrode into which the lithium ions can be inserted. The positive- and negative-electrode SOC deviation capacity $Q_{Li}$ corresponds to the number of lithium ions that are capable of moving between the positive electrode and the negative electrode, and the ease of movement of the overall lithium ions.

Therefore, the smallest of the negative electrode capacity $Q_a$, the positive electrode capacity $Q_c$, and the positive- and negative-electrode SOC deviation capacity $Q_{Li}$ corresponds to the battery capacity $Q_B$ of the secondary battery 11.

In addition, at step S131, the information calculation system 1 determines the battery resistance $R_B$ that is the resistance value of the overall secondary battery 11 from $R_B=R_a+R_c$. That is, the information calculation system 11 determines a total sum of the resistance values of the sections (the negative electrode resistance $R_a$ and the positive electrode resistance $R_c$ according to the present embodiment) configuring the secondary battery 11 as the resistance value of the overall secondary battery 11.

As described above, the negative electrode resistance $R_a$, the positive electrode resistance $R_c$, the negative electrode capacity $Q_a$, the positive electrode capacity $Q_c$, the positive- and negative-electrode SOC deviation capacity $Q_{Li}$, the battery capacity $Q_B$, and the battery resistance $Q_B$ of the secondary battery 11 at the primary use are each calculated. The first degradation states $SOHQ_a1$, $SOHQ_c1$, $SOHQ_{Li}1$, $SOHR_a1$, and $SOHR_c1$ are then calculated based on the calculated negative electrode resistance $R_a$, positive electrode resistance $R_c$, negative electrode capacity $Q_a$, positive electrode capacity $Q_c$, positive- and negative-electrode SOC deviation capacity $Q_{Li}$, battery capacity $Q_B$, and battery resistance $Q_B$. That is, for example, the first degradation state $SOHQ_a1$ is calculated by the proportion of the negative electrode capacity $Q_a$ of the secondary battery 11 at the primary use in relation to the initial capacity of the negative electrode of the secondary battery 11 being determined.

As described above, as a result of the degradation state of each constituent element of the secondary battery 11 being calculated taking into consideration the plurality of degradation factors of the constituent elements, prediction of the degradation state of each constituent element of the secondary battery 11 can be performed with high accuracy. This will be described below.

Here, a following simulation was performed under an assumption of two secondary batteries 11 of the same type (for convenience, the two secondary batteries 11 are differentiated as a first battery and a second battery; however, the two batteries are of the same type). Results of the simulation are shown in FIG. 8.

Figure 8:
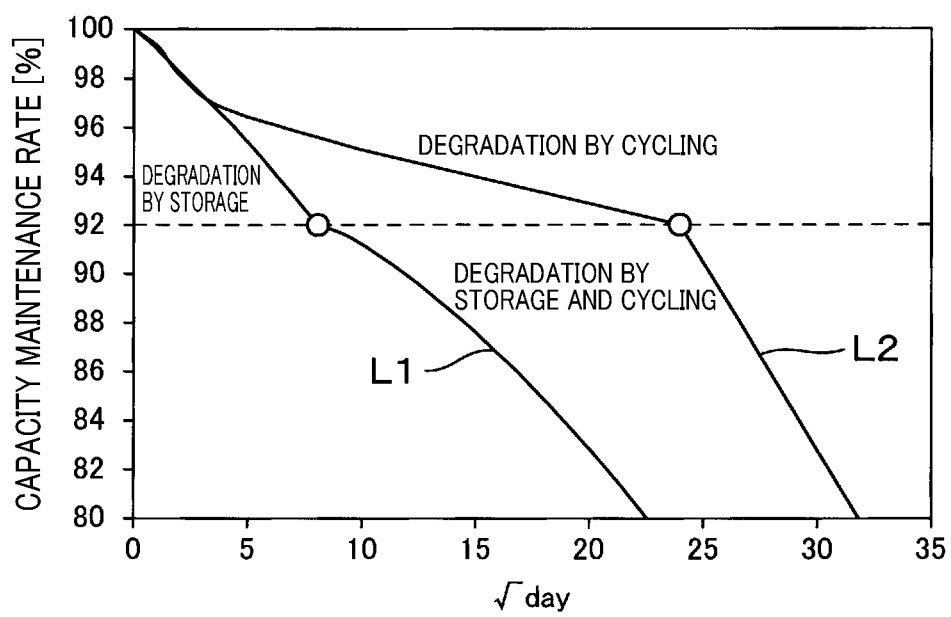
FIG. 8 is a graph of aspects of degradation of a first battery and a second battery according to the first embodiment.

A horizontal axis of a graph in FIG. 8 indicates a square root of the number of days and a vertical axis indicates the capacity maintenance rate of the secondary battery 11. Here, the capacity maintenance rate of the secondary battery 11 at a predetermined amount of time is the proportion of the capacity of the secondary battery 11 at the predetermined time in relation to the capacity of the secondary battery 11 in the initial state. In addition, in FIG. 8, experimental results related to the first battery are indicated by line L1 and experimental results related to the second battery are indicated by line L2.

In the respective results of the first battery and the second battery shown in FIG. 8, the positive- and negative-electrode SOC deviation capacity $Q_{Li}$ is the smallest among the negative electrode capacity $Q_a$, the positive electrode capacity $Q_c$, and the positive- and negative-electrode SOC deviation capacity $Q_{Li}$. The battery capacity $Q_B$=the positive- and negative-electrode SOC deviation capacity $Q_{Li}$. In addition, the capacity maintenance rate in FIG. 8 is the proportion of the positive- and negative-electrode SOC deviation capacity $Q_{Li}$ after degradation in relation to the initial capacity of the secondary battery 11.

Here, the secondary battery 11 through which a large current flows, such as that used for vehicle driving and the like, is often only used in a range in which the positive- and negative-electrode SOC deviation capacity $Q_{Li}$ is the smallest among the negative electrode capacity $Q_a$, the positive electrode capacity $Q_c$, and the positive- and negative-electrode SOC deviation capacity $Q_{Li}$ of the secondary battery 11. That is, in the secondary battery 11 through which a large current flows, the battery capacity $Q_B$ is often the positive- and negative-electrode SOC deviation capacity $Q_{Li}$.

From a state in which the capacity maintenance rate is 100%, the first battery was degraded by storage in a 45° C. environment until the capacity maintenance rate was reduced to 92%. Regarding the decrease in capacity of the first battery when the first battery was degraded by storage from the capacity maintenance rate of 100% to the capacity maintenance rate of 92%, 7.2% of the decrease in capacity was attributed to the film formation on each electrode, 0.4% was attributed to the film formed on the surface of the active material of the electrode cracking, and 0.4% was attributed to the active material itself of the electrode cracking.

From a state in which the capacity maintenance rate is 100%, the second battery was degraded by cycling in a 45° C. environment until the capacity maintenance rate was reduced to 92%. Regarding the decrease in capacity of the second battery when the second battery was degraded by cycling from the capacity maintenance rate of 100% to the capacity maintenance rate of 92%, 4.0% of the decrease in capacity was attributed to the film formation on each electrode, 1.6% was attributed to the film formed on the surface of the active material of the electrode cracking, and 2.4% was attributed to the active material itself of the electrode cracking.

That is, although the first battery and the second battery have the same capacity maintenance rate and positive- and negative-electrode SOC deviation capacity $Q_{Li}$, the values of the functions $k_A$, $k_B$, $k_C$, $l_A$, $l_B$, and $l_C$ in expression (11) that configure the positive- and negative-electrode SOC deviation capacity $Q_{Li}$ differ between the first battery and the secondary battery based on usage states up to a current point.

In addition, the first battery and the second battery of which the capacity maintenance rates are 92% were degraded under the same conditions by a combination of degradation by storage and degradation by cycling. As a result, as shown in FIG. 5, it has become clear that the second battery that had been degraded by cycling first degrades faster (that is, a slope in the graph in an area at the capacity maintenance rate of 92% and below in FIG. 5 increases) than the first battery that had been degraded by storage first.

Therefore, it is clear that, even in the secondary batteries 11 that have the same capacity maintenance rate, depending on the usage states of the secondary batteries 11 up to the current point, a degree of progression in subsequent degradation of the secondary battery 11 differs.

In addition, it is clear that the battery capacity $Q_B$ can be calculated with high accuracy as a result of the positive- and negative-electrode SOC deviation capacity $Q_{Li}$ being calculated based on the functions $k_A$ and $l_A$ that take into consideration the film being formed on each electrode, the functions $k_B$ and $l_B$ that take into consideration the film formed on the surface of the active material of each electrode cracking, and the functions $k_C$ and $l_C$ that take into consideration the active material itself of each electrode cracking.

Here, the foregoing similarly applies to when the battery capacity $Q_B$ is the negative electrode capacity $Q_a$ or the positive electrode capacity $Q_c$.

In addition, the negative electrode resistance $R_a$ and the positive electrode resistance $R_c$ can be calculated taking into consideration the plurality of degradation factors as well. Therefore, based on a theory that is similar to the above-described theory by which the battery capacity $Q_B$ is calculated with high accuracy, it can be said that the negative electrode resistance $R_a$ and the positive electrode resistance $R_c$ can also be calculated with high accuracy.

In accompaniment, the first degradation states $SOHQ_a1$, $SOHQ_c1$, $SOHQ_{Li}1$, $SOHR_a1$, and $SOHR_c1$ that have the negative electrode capacity $Q_a$, the positive electrode capacity $Q_c$, the positive- and negative-electrode SOC deviation capacity $Q_{Li}$, the negative electrode resistance $R_a$, or the positive electrode resistance $R_c$ as the parameter are also calculated with high accuracy.

Furthermore, the calculation method for calculating the second degradation states $SOHQ_a2$, $SOHQ_c2$, $SOHQ_{Li}2$, $SOHR_a2$, and $SOHR_c2$ of the secondary battery 11 at secondary use in the information calculation system 1 is similar to the calculation method for the first degradation states $SOHQ_a1$, $SOHQ_c1$, $SOHQ_{Li}1$, $SOHR_a1$, and $SOHR_c1$. Based on reasons similar to the reasons by which the first degradation states can be calculated with high accuracy, the second degradation states can also be calculated with high accuracy.

Next, working effects according to the present embodiment will be described.

The information calculation system 1 according to the present embodiment calculates the future second degradation states of a plurality of battery constituent elements of the secondary battery 11 when the secondary battery 11 is used in a future application, based on the first degradation states related to the battery constituent elements, the estimated load information, and the plurality of degradation factors related to the battery constituent elements. Therefore, as described above, the second degradation states of the secondary battery 11 when the secondary battery 11 is used in a future application can be predicted with high accuracy.

In addition, the information calculation system 1 calculates each of the first degradation states and the second degradation states using the plurality of functions $g_A$, $g_B$, $g_C$, $i_A$, $i_B$, and $i_C$ is that are correlated with the plurality of degradation factors of the negative electrode of the secondary battery 11, the plurality of functions $h_A$, $h_B$, $h_C$, $j_A$, $j_B$, and $j_C$ that are correlated with the plurality of degradation factors of the positive electrode of the secondary battery 11, and the plurality of functions $k_A$, $k_B$, $k_C$, $l_A$, $l_B$, and $l_C$ that are correlated with the plurality of degradation factors of the electrolyte of the secondary battery 11.

As a result, accurate first degradation states and second degradation states that take into consideration the various degradation factors (that is, film formation, film cracking, and cracking of the active material itself) of each section of the secondary battery 11 can be calculated.

Furthermore, the information calculation system 1 calculates the residual value of the secondary battery 11 based on the future application of the secondary battery 11 and the calculated second degradation states. As described above, in the information calculation system 1 according to the present embodiment, the residual value of the secondary battery 11 after the primary use can be accurately calculated based on the application of the secondary battery 11. Therefore, as a result of the residual value of the secondary battery 11 being calculated using the information calculation system 1, the residual value of the used secondary battery 11 can be accurately ascertained.

As described above, according to the present embodiment, an information calculation system that is capable of improving accuracy of degradation prediction regarding a secondary battery at time of reuse can be provided.

Second Embodiment

Figure 9:
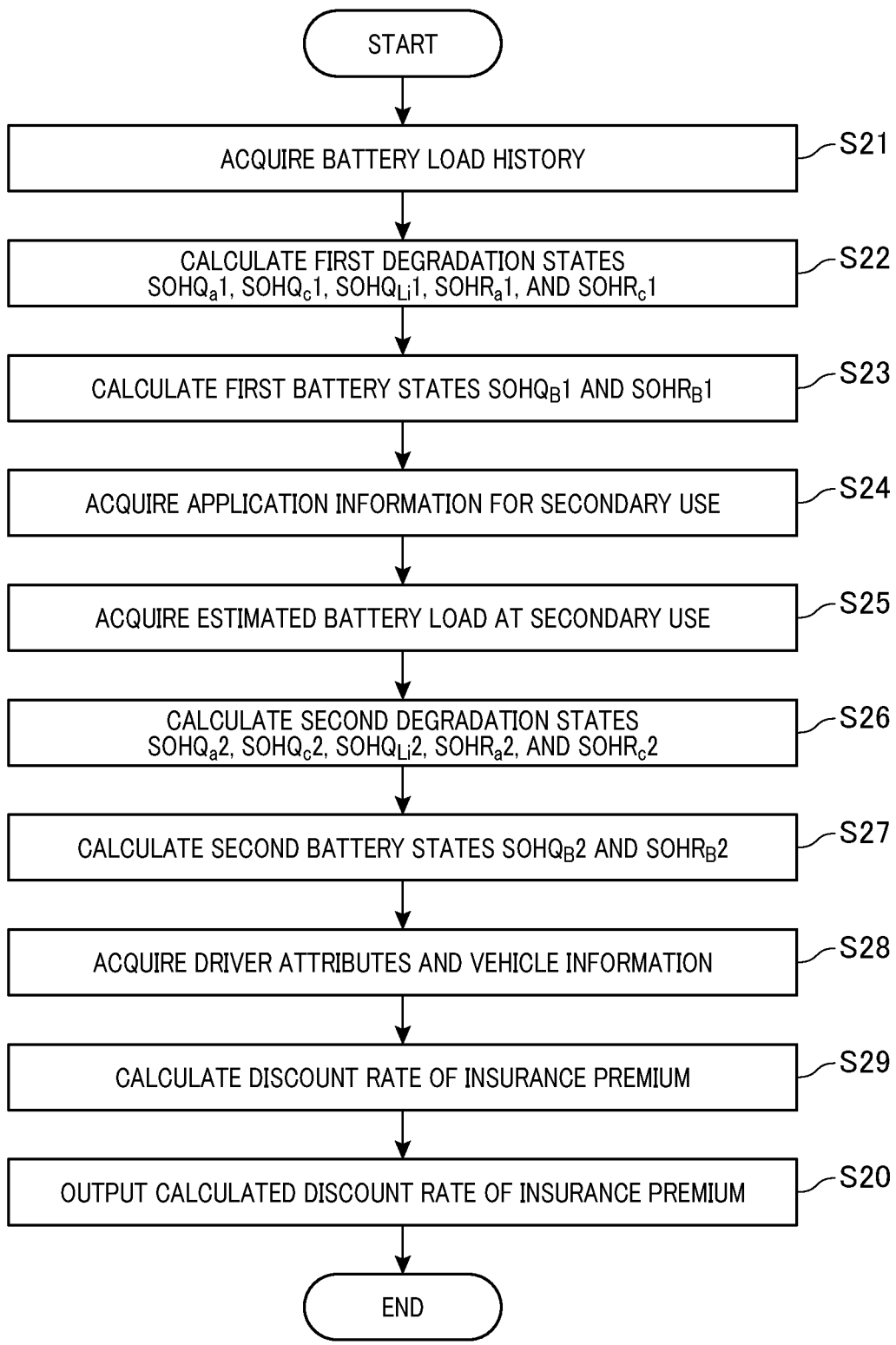
FIG. 9 is a flowchart for explaining a process performed by the information calculation system according to a second embodiment.

According to a present embodiment, the information calculation system 1 calculates a discount rate of an insurance premium for a used vehicle in which the secondary battery 11 is mounted, based on the degradation state of the secondary battery 11. According to the present embodiment, the information calculation system 11 is assumed to calculate the insurance premium for a so-called PAYD-type (that is, an actual traveling distance linked-type) insurance. Here, PAYD is an abbreviation of Pay As You Drive. Hereafter, steps for calculating the discount rate of the insurance premium for a used vehicle will be described with reference to a flowchart in FIG. 9.

First, at step S21, the information calculation system 1 acquires the battery load history of the secondary battery 11 that is mounted in the used vehicle, from the BMU 12 or the like of the used vehicle.

Next, at step S22, the information calculation system 1 calculates the first degradation states $SOHQ_a1$, $SOHQ_c1$, $SOHQ_{Li}1$, $SOHR_a1$, and $SOHR_c1$ in a manner similar to that according to the first embodiment, using the acquired battery load history.

Next, at step S23, the information calculation system 1 calculates the first battery states $SOHQ_B1$ and $SOHR_B1$ in a manner similar to that according to the first embodiment, using the calculated first degradation states.

Next, at step S24, the information calculation system 1 acquires application information for secondary use. For example, as the application information, the information calculation system 1 acquires a purpose of use (such as commuting or commercial use) of the vehicle for secondary use. For example, the application information may be inputted to the server computer by an input means, such as a keyboard or a mouse, that is provided in the server computer being operated. Alternatively, the server computer may receive the application information from a computer that is provided with the application information.

Next, at step S25, the information calculation system 1 acquires the estimated load information on a load that is estimated to act on the secondary battery 11 during the secondary use, in light of the application information for secondary use. The estimated load information includes the charging/discharge current, the SOC, the temperature, and the usage period of the secondary battery 11. These pieces of estimated load information are calculated using a map or the like in which a relationship between the application for secondary use and the estimated load is recorded. For example, the map is generated taking into consideration a standard traveling pattern for each application for secondary use and stored in the server computer in advance.

Next, at step S26, the information calculation system 1 calculates the second degradation states $SOHQ_a2$, $SOHQ_c2$, $SOHQ_{Li}2$, $SOHR_a2$, and $SOHR_c2$ of the secondary battery 11 at the secondary use in a manner similar to that according to the first embodiment, using the acquired estimated load information.

Next, at step S27, the information calculation system 1 calculates the second battery states $SOHQ_B2$ and $SOHR_B2$ in a manner similar to that according to the first embodiment, using the calculated second degradation states.

Next, at step S28, the information calculation system 1 acquires driver attributes and vehicle information regarding the secondary use. The driver attributes include license information (such as whether a driver is a good driver), driving history, class, and the like of a driver who is expected to drive the vehicle for secondary use. The vehicle information includes information on power consumption and the like for each vehicle type.

For example, the driver attributes and the vehicle information regarding the secondary use may be inputted to the server computer by an input means, such as a keyboard or a mouse, that is provided in the server computer being operated. Alternatively, the server computer may receive these pieces of information from a computer that is provided with the pieces of information.

Next, at step S29, the information calculation system calculates the discount rate of the insurance premium based on the capacity maintenance rate and the resistance increase rate after the vehicle has traveled an estimated annual traveling distance from the start of secondary use, as well as the driver attributes and the vehicle information.

For example, the information calculation system 1 calculates the discount rate of the insurance premium based on a comparison between a predicted value of the capacity maintenance rate after the vehicle travels the estimated annual traveling distance from the start of secondary use and a manufacturer guaranteed value regarding the capacity maintenance rate. For example, the discount rate increases as the predicted capacity maintenance rate becomes greater than manufacturer guaranteed value.

In addition, the information calculation system 1 calculates the discount rate of the insurance premium based on a comparison between a predicted value of the resistance increase rate and a manufacturer guaranteed value regarding the resistance increase rate. For example, the discount rate increases as predicted resistance increase rate becomes smaller than the manufacturer guaranteed value.

Furthermore, the information calculation system 1 calculates the discount rate of the insurance premium based on the driver attributes and the vehicle information as well. For example, the discount rate of the insurance premium increases as the driver attributes become favorable. Here, the driver attributes are considered more favorable as factors (such as the driver being a good driver) that reduce likelihood of the driver being in an accident increase.

As described above, the information calculation system 1 calculates the discount rate of the insurance premium by taking into consideration all of the capacity maintenance rate, the resistance increase rate, the driver attributes, and the vehicle information. In other words, it can be said that the discount rate of the insurance premium increases as the residual value of the secondary battery 11 increases, and the discount rate of the insurance premium indicates the residual value of the secondary battery 11.

Next, at step S20, the information calculation system 1 outputs the calculated discount rate of the insurance premium to the server computer that configures the information calculation system 1 (for example, the discount rate is displayed in the display 5 or printed).

Here, among reference numbers used according to the second and subsequent embodiments, reference numbers that are identical to those used in previous embodiments indicate similar constituent elements as those according to the previous embodiments unless particularly noted otherwise.

According to the present embodiment, the discount rate of the insurance premium of the vehicle in a future application is calculated based on a highly accurate prediction value of the second battery state of the secondary battery 11 when the secondary battery 11 is used in the future application. Therefore, a discount rate of an insurance premium that accurately reflects the degradation state of the secondary battery 11 can be calculated.

Here, according to the present embodiment, the discount rate of the insurance premium is calculated and outputted. However, the configuration may be such that the insurance premium after discount is calculated and outputted. In addition, the information calculation system 1 may calculate the discount rate of the insurance premium by taking into consideration at least either of the capacity maintenance rate and the resistance increase rate.

Third Embodiment

Figure 10:
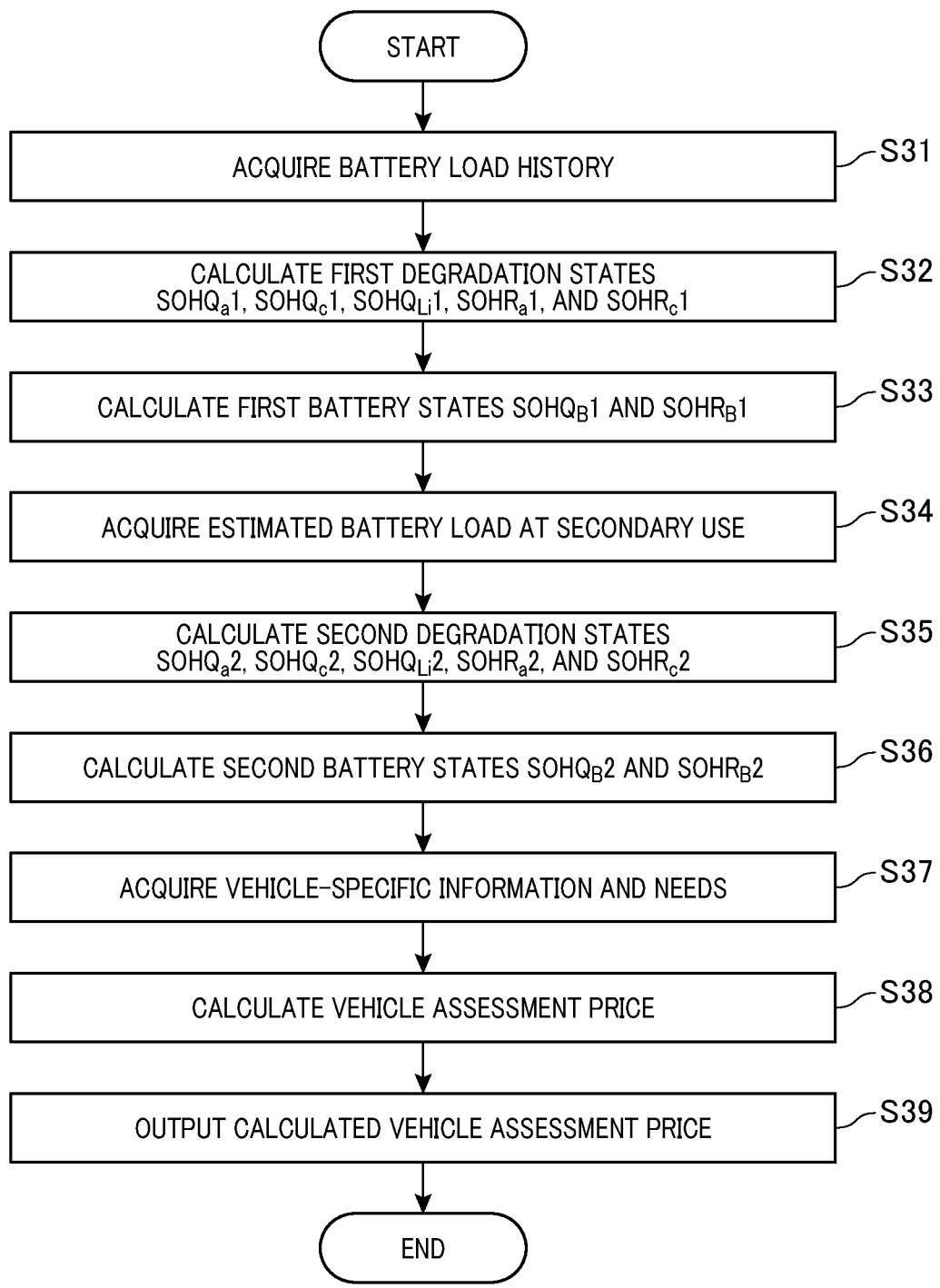
FIG. 10 is a flowchart for explaining a process performed by the information calculation system according to a third embodiment.

According to a present embodiment, the information calculation system 1 calculates a selling price of a used vehicle in which the secondary battery 11 is mounted, based on the degradation state of the secondary battery 11. Steps for calculating the selling price of the used vehicle will be described hereafter with reference to a flowchart in FIG. 10.

First, at step S31, the information calculation system 1 acquires the battery load history of the secondary battery 11 that is mounted in the used vehicle from the BMU 12 of the used vehicle or the like.

Next, at step S32, the information calculation system 1 calculates the first degradation states $SOHQ_a1$, $SOHQ_c1$, $SOHQ_{Li}1$, $SOHR_a1$, and $SOHR_c1$ in a manner similar to that according to the first embodiment, using the acquired battery load history.

Next, at step S33, the information calculation system 1 calculates the first battery states $SOHQ_B1$ and $SOHR_B1$ in a manner similar to that according to the first embodiment, using the calculated first degradation states.

Next, at step S34, the information calculation system 1 acquires the estimated load information on a load that is estimated to act on the secondary battery 11 during the secondary use. The estimated load information includes the charging/discharge current, the SOC, the temperature, and the usage period of the secondary battery 11. The estimated load information can be the estimated load that acts on the secondary battery 11 when the vehicle travels in a typical traveling pattern.

Next, at step S35, the information calculation system 1 calculates the second degradation states $SOHQ_a2$, $SOHQ_c2$, $SOHQ_{Li}2$, $SOHR_a2$, and $SOHR_c2$ of the secondary battery 11 at the secondary use in a manner similar to that according to the first embodiment, using the acquired estimated load information.

Next, at step S36, the information calculation system 1 calculates the second battery states $SOHQ_B2$ and $SOHR_B2$ in a manner similar to that according to the first embodiment, using the second degradation states.

Next, at step S37, the information calculation system 1 acquires vehicle-specific information and needs. For example, the vehicle-specific information includes information on a year the vehicle was manufactured, presence/absence of external vehicle parts, the traveling distance, constituent components that are mounted in the vehicle (such as engine components, various cooling apparatuses, a power transmission mechanism, an air conditioning apparatus, a fuel apparatus, brakes, steering, a door mechanism, ornaments, and an exhaust apparatus), vehicle interior and exterior, and the like.

In addition, needs include needs of a used vehicle market, auction reference prices, locality, and the like. For example, the vehicle-specific information and the needs may be inputted to the server computer by an input means, such as a keyboard or a mouse, that is provided in the server computer being operated. Alternatively, the server computer may receive the vehicle-specific information and the needs from a computer that is provided with the vehicle-specific information and the needs.

Next, at step S38, the information calculation system 1 determines an assessment price of the used vehicle based on the second battery states $SOHQ_B2$ and $SOHR_B2$, the vehicle-specific information, and the needs, such as by referencing a map that is stored in the information calculation system 1. The assessment price of the used vehicle reflects a price of the secondary battery 11 of the used vehicle.

Next, at step S39, the information calculation system 1 outputs the assessment price of the used vehicle to the server computer that configures the information calculation system 1 (for example, the assessment price is displayed in the display 5 or printed).

According to the present embodiment as well, the assessment price of the used vehicle is calculated based on a highly accurate prediction value of the second battery state of the secondary battery 11. Therefore, the assessment price of a used vehicle that accurately reflects the degradation state of the secondary battery 11 can be calculated.

Fourth Embodiment

According to a present embodiment, the information calculation system 1 assists in efficient charging of the secondary battery 11 that is mounted in a vehicle. More specifically, the information calculation system 1 according to the present embodiment is a system that sets the temperature of the secondary battery 11 when the vehicle arrives at a charging facility, such as a charging stand, to a temperature that is appropriate for charging.

Figure 11:
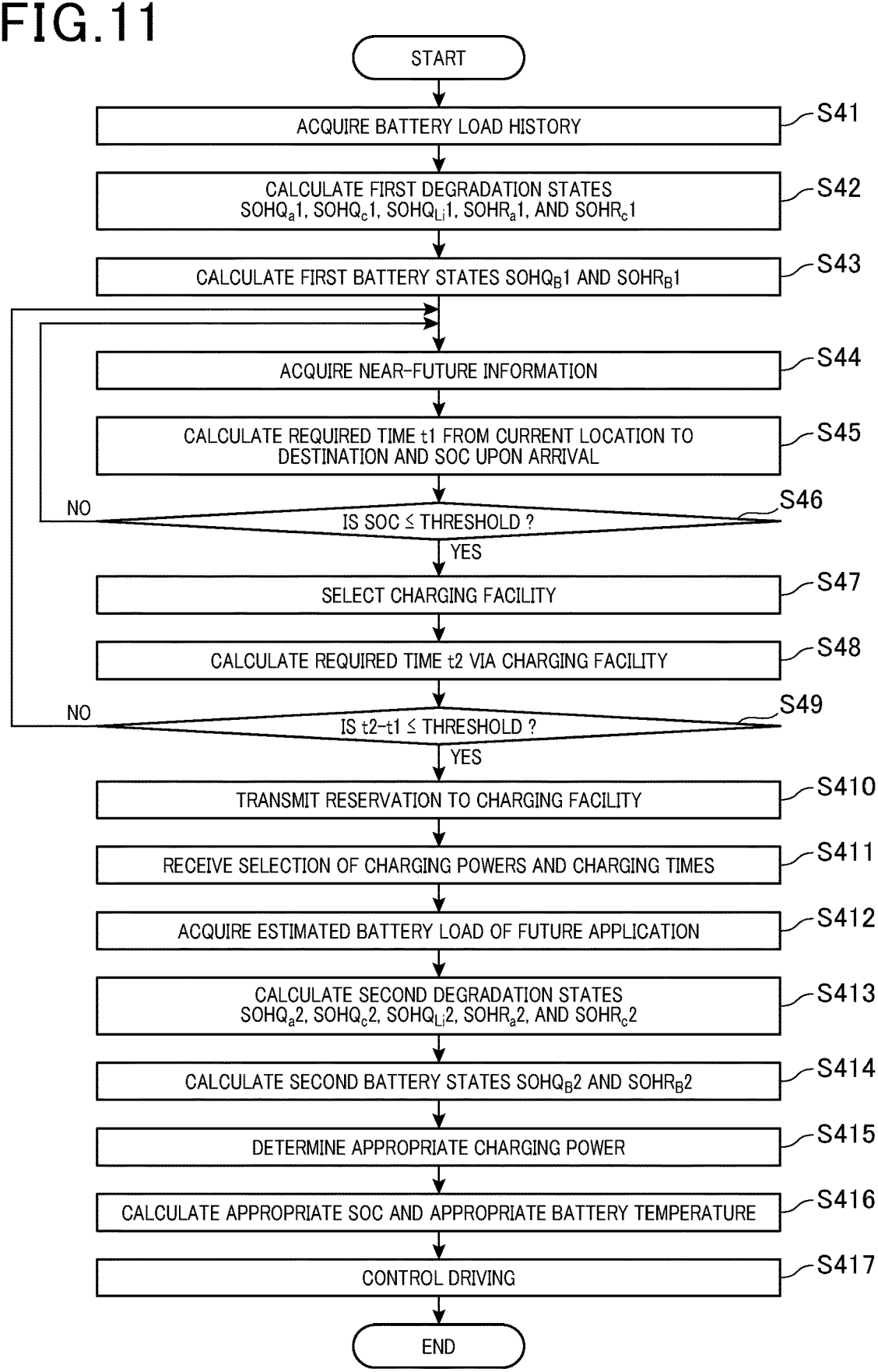
FIG. 11 is a flowchart for explaining a process performed by the information calculation system according to a fourth embodiment.

In addition, according to the present embodiment, the future application is vehicle traveling from a current location to the charging facility. According to the present embodiment, the information calculation system 1 is configured by the BMU 12 that is mounted in the vehicle and the like. The present embodiment will be described below with reference to a flowchart in FIG. 11.

First, at step S41, the information calculation system 1 acquires the battery load history of the secondary battery 11 that is mounted in the vehicle from the BMU 12 of the vehicle or the like.

Next, at step S42, the information calculation system 1 calculates the first degradation states $SOHQ_a1$, $SOHQ_c1$, $SOHQ_{Li}1$, $SOHR_a1$, and $SOHR_c1$ up to the current location in a manner similar to that according to the first embodiment, using the acquired battery load history.

Then, at step S43, the information calculation system 1 calculates the first battery states $SOHQ_B1$ and $SOHR_B1$ up to the current location in a manner similar to that according to the first embodiment, using the calculated first degradation states.

Next, at step S44, the information calculation system 1 acquires near-future information. The near-future information includes traffic information, facility information, and the like regarding a vicinity of a predetermined section (such as a shortest route and expressed by hatching in FIG. 12) from a current location of a vehicle 10 to a destination G. For example, the near-future information includes a section average vehicle speed, a section altitude (that is, elevation), a distance to the destination G, traffic jam information, environmental temperature, charging facility information (such as a location of the charging facility, charging capabilities, an operational state).

The vehicle 10 in which the secondary battery 11 is mounted includes a car navigation system as a part of the information calculation system 1. The information calculation system 1 acquires the near-future information through a publicly known method using the car navigation system. The car navigation system includes a global positioning system (GPS) receiving unit, a vehicle information and communication system (VICS [registered trademark]) receiving unit, a calculating unit, and a display. The information calculation system 1 acquires the near-future information using reception information of the GPS receiving unit, reception information of the VICS receiving unit, and results of a predetermined calculation performed using these pieces of information.

Next, at step S45, the information calculation system 1 calculates a required time t1 from the current location to the destination G, and the SOC of the secondary battery 11 upon arrival at the destination G. For example, the required time t1 is calculated taking into consideration the average vehicle speed, the distance, the traffic jam state, and the like of the section from the current location to the destination G, among the pieces of near-future information.

Figure 12:
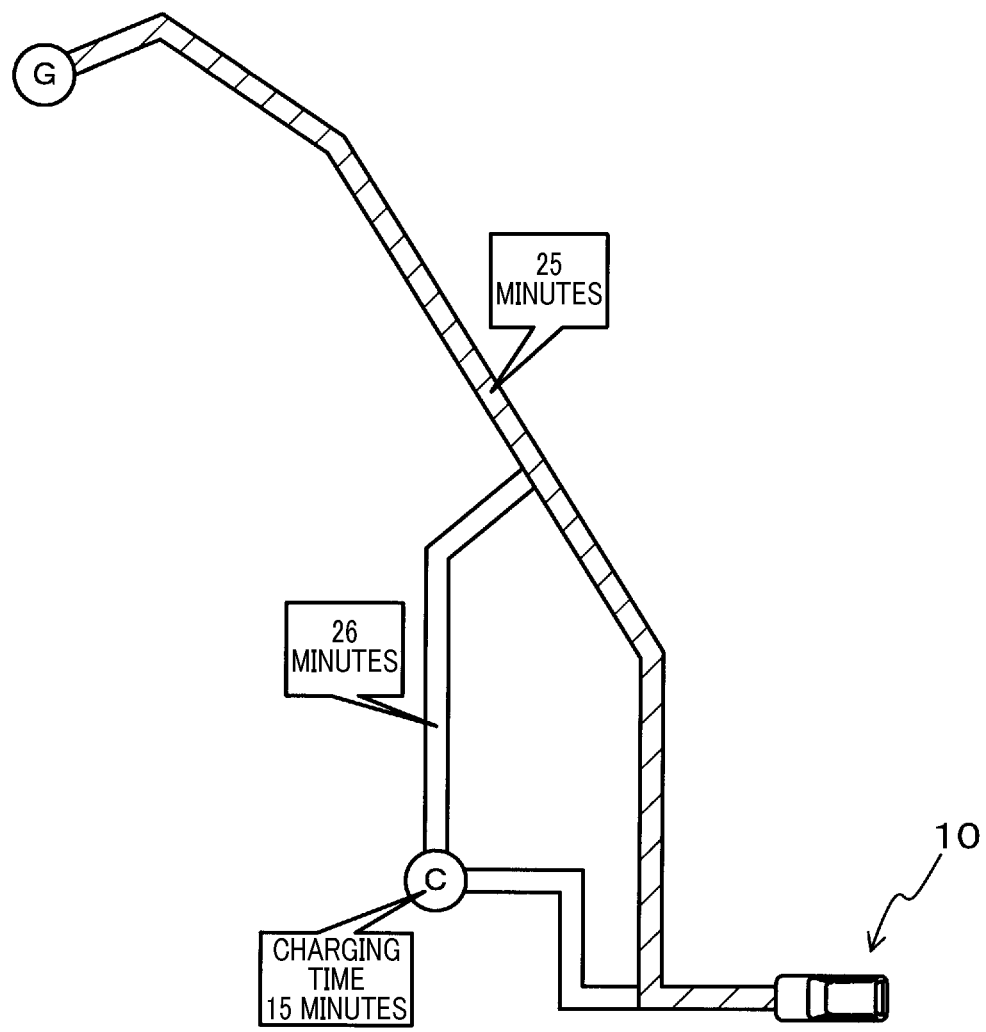
FIG. 12 is a conceptual diagram of map information of a map from a current location to a destination of a vehicle, according to the fourth embodiment.

FIG. 12 shows an example in which the required time is 25 minutes. The SOC of the secondary battery 11 upon arrival at the destination G is calculated taking into consideration the current SOC of the secondary battery 11 and power consumption specific to the vehicle.

Next, at step S46, the information calculation system 1 determines whether the SOC of the secondary battery 1 upon arrival at the destination calculated at step S45 is equal to or less than a predetermined threshold. When determined that the SOC is equal to or less than the predetermined threshold, as shown in FIG. 12, the information calculation system 1 displays, in the display of the car navigation system, a charging facility C that is in a location that is a predetermined distance or less from a set route to the destination G. Here, when the SOC exceeds the threshold, the information calculation system 1 returns to step S44.

Next, at step S47, for example, the driver directly operates an operating unit (such as a touch panel) of the car navigation system and selects the charging facility C through which the vehicle 10 will pass, among the charging facilities that are displayed.

Next, at step S48, the information calculation system 1 calculates a required time t2 from the current location to the destination G when the vehicle 10 passes through the selected charging facility C (referred to, hereafter, as simply a "charging facility C"). The required time t2 is an amount of time that includes time required for the secondary battery 11 to be charged to a predetermined SOC at the charging facility C. That is, in FIG. 12, 26 minutes that is the amount of time required for the vehicle 10 to reach the destination G by way of the charging facility C (not taking into consideration the charging time) and 15 minutes that is the amount of time required for charging are indicated. In this case, t2 is 26 minutes+15 minutes=41 minutes.

Next, at step S49, the information calculation system 1 determines whether a difference t2−t1 between the required time t2 by way of the charging facility C calculated at step S48 and the required time t1 calculated at step S45 is equal to or less than a threshold.

Next, at step S410, when t2−t1 is equal to or less than a predetermined value, the information calculation system 1 transmits an expected arrival time and a charging reservation to the charging facility C. Here, a reservation with the charging facility C may be made through selection by the driver, without the comparison between t2−t1 and the threshold being performed. In addition, when t2−t1 exceeds the threshold, the information calculation system 1 returns to step S44 after step 49.

Next, at step S411, the information calculation system 1 receives charging power and the charging time from the charging facility C. A plurality of charging standards are present as the charging capabilities of the charging facility C. The information calculation system 1 receives the charging power and the charging time to a predetermined SOC for each charging standard.

Next, at step S412, the information calculation system 1 acquires the estimated load information of a load that is estimated to act on the secondary battery 11 in accompaniment with traveling of the vehicle 10 from the current location to the charging facility C. The estimated load information includes the charging/discharge current, the SOC, the temperature, and the usage period of the secondary battery 11.

The estimated load information can be an estimated load that acts on the secondary battery 11 when the vehicle 10 travels in a typical traveling pattern, taking into consideration the near-future information (that is, the section average vehicle speed, the section altitude, the distance to the destination G, the traffic jam information, and the environmental temperature) from the current location to the destination G. That is, these pieces of near-future information are correlated with the current that flows to the secondary battery 11. Therefore, the estimated battery load that is estimated to act on the secondary battery 11 in the future can be calculated from the near-future information.

Next, at step S413, the information calculation system 1 calculates the second degradation states $SOHQ_a2$, $SOHQ_c2$, $SOHQ_{Li}2$, $SOHR_a2$, and $SOHR_c2$ of the secondary battery 11 at the secondary use in a manner similar to that according to the first embodiment, using the acquired estimated load information.

Next, at step S414, the information calculation system 1 calculates the second battery states $SOHQ_B2$ and $SOHR_B2$ in a manner similar to that according to the first embodiment, using the second degradation states.

Next, at step S415, the information calculation system 1 determines an appropriate charging power. The appropriate charging power is a charging power at which the charging time is short and degradation of the secondary battery 11 can be suppressed, among a selection of a plurality of charging powers acquired at step S411. The appropriate charging power will be described with reference to FIG. 13 and FIG. 14.

Figure 13:
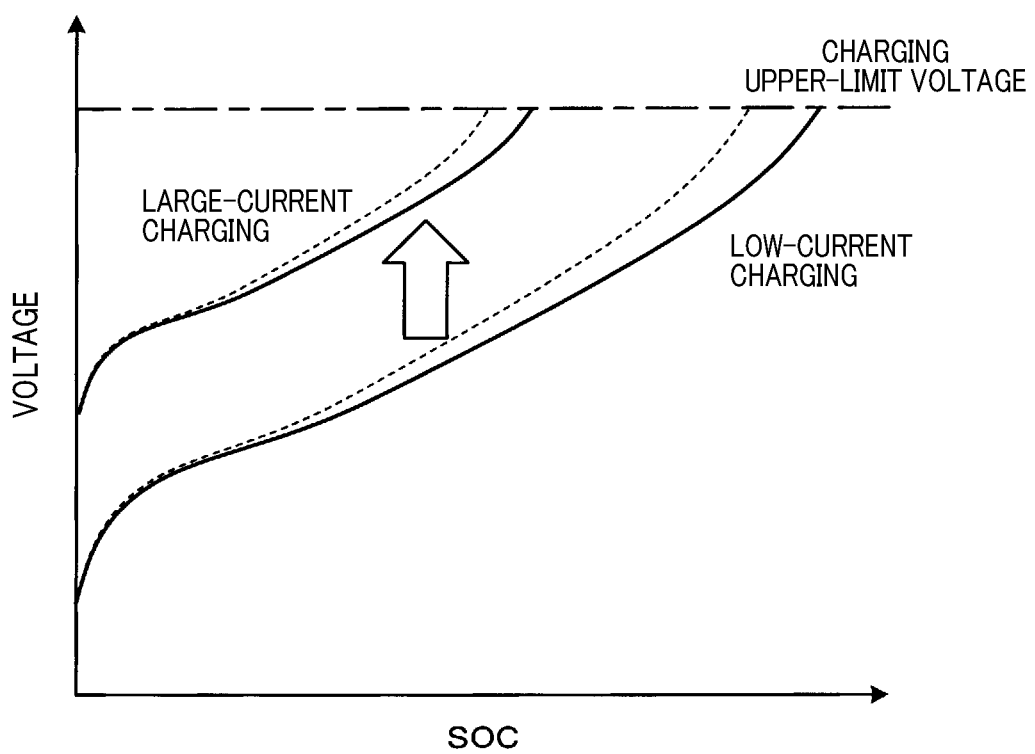
FIG. 13 is a graph of relationships between an SOC and a charging voltage of the secondary battery in low-current charging and high-current charging, according to the fourth embodiment.

FIG. 13 shows a relationship between the SOC and the voltage during charging of the secondary battery 11. In FIG. 13, the SOC on a horizontal axis is such that the SOC increases towards a right side. The voltage on a vertical axis is such that the voltage increases towards an upper side. As shown in FIG. 13, in a case of low-current charging, the voltage of the secondary battery 11 is relatively low.

Meanwhile, in a case of large-current charging (that is, fast charging), the voltage applied to the secondary battery 11 increases compared to that in the case of low-current charging as a result of resistance overvoltage. Therefore, in the case of large-current charging, the voltage reaches a charging upper-limit voltage more quickly than in the case of low-current charging. When the charging upper-limit voltage is exceeded, degradation of the secondary battery 11 (such as precipitation of lithium) is more easily occurs.

In addition, in FIG. 13, the relationship between the SOC and the voltage when degradation of the secondary battery 11 has progressed beyond than that indicated by a solid line is indicated by a broken line. That is, when the degradation of the secondary battery 11 progresses, the charging current value easily increases and the voltage tends to more quickly reach the charging upper-limit voltage. The relationship between the SOC and the voltage for each degree of degradation of the secondary battery 11 (that is, at least either of the second battery states $SOHQ_B2$ and $SOHR_B2$) is stored in the non-volatile storage unit 3 of the information calculation system 1 in advance.

Figure 14:
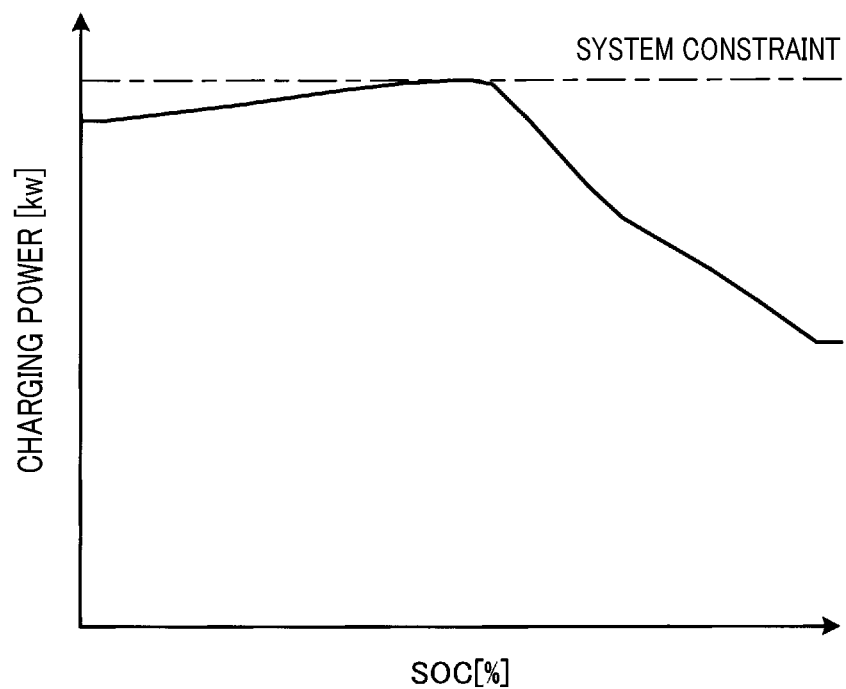
FIG. 14 is a graph of restriction to charging power applied to the secondary battery when the charging power of the secondary battery reaches a system constraint value, according to the fourth embodiment.

Here, FIG. 14 is a graph of an example of charging at the charging facility C. FIG. 14 shows a diagram of a relationship between the SOC and the charging power of the secondary battery 11. As shown in FIG. 14, when the voltage of the secondary battery 11 reaches the charging upper-limit voltage during charging, the charging power is restricted by the charging facility C and charging is switched to charging at low power. As a result, the amount of time until charging is completed becomes longer. Taking the foregoing into consideration, the information calculation system 1 determines the appropriate charging power at which the charging time is short and degradation of the secondary battery 11 can be suppressed.

Next, at step S416, the information calculation system 1 calculates an appropriate SOC and an appropriate battery temperature. The appropriate SOC and the appropriate battery temperature are the SOC and the temperature of the secondary battery 11 upon arrival at the charging facility C, and the SOC and the temperature of the secondary battery 11 that is suitable for charging of the secondary battery 11. The appropriate SOC and the appropriate temperature will be described with reference to FIG. 15 and FIG. 16.

First, a relationship between the battery temperature that is the temperature of the secondary battery 11 and a full-charge current, described hereafter, will be described with reference to FIG. 15.

Figure 15:
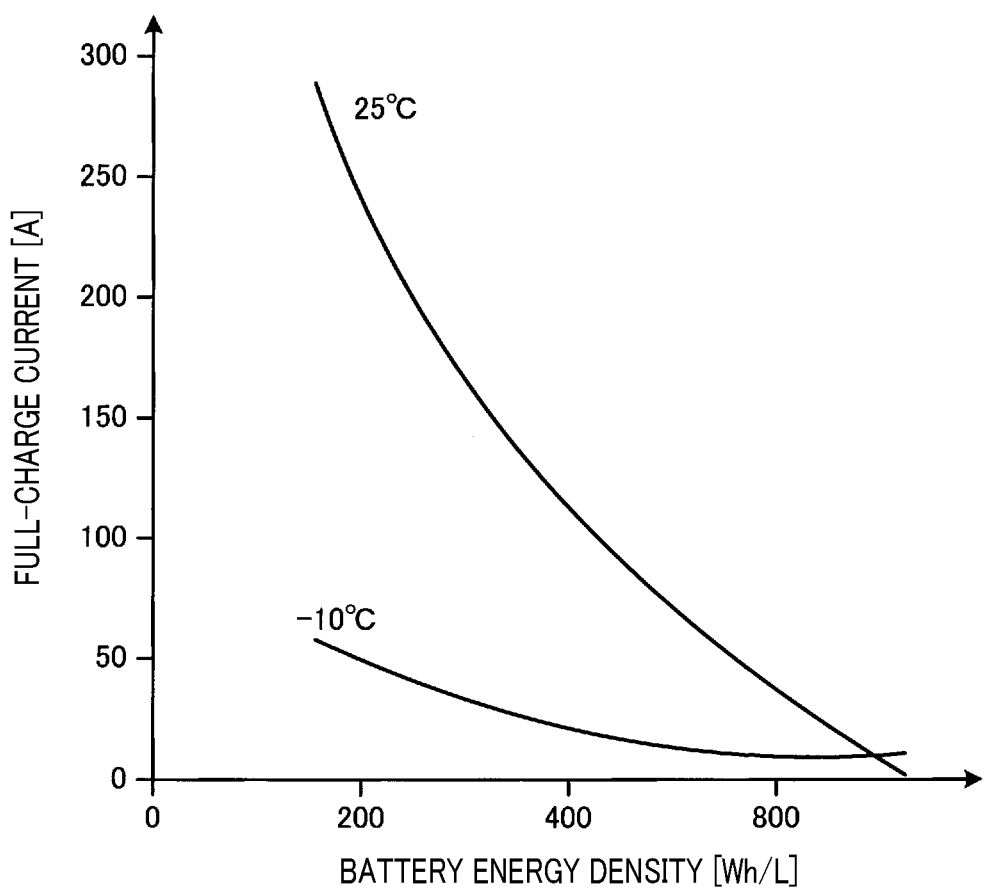
FIG. 15 is a graph of relationships between a battery energy density and a full-charge current when the secondary battery is −10° C. and 25° C., according to the fourth embodiment.

FIG. 15 shows a relationship between the full-charge current when the battery temperature is −10° C., the full-charge current when the battery temperature is 25° C., and battery energy density [Wh/L]. The full-charge current is a maximum value of a current value at which charging from a lower-limit SOC to an upper-limit SOC can be performed at a fixed current value. The lower-limit SOC is a lower-limit value of the SOC that is allowed in the secondary battery 11. The upper-limit SOC is an upper-limit value of the SOC that is allowed in the secondary battery 11. The lower-limit SOC and the upper-limit SOC are values that are prescribed for each vehicle or each power supply system.

Based on FIG. 15, it is clear that the full-charge current value becomes extremely low when the battery temperature is a low temperature such as −10° C. (such as a vehicle that is traveling in a cold region). Meanwhile, the full-charge current value increases when the battery temperature is relatively high, such as 25° C. That is, the battery temperature is preferably high to a certain extent to increase the full-charge current (that is, to shorten the charging time). Here, in a typical vehicle in which the secondary battery 11 is mounted, a cooling apparatus for preventing the battery temperature from reaching a predetermined temperature (such as 50° C.) or higher is provided, from a perspective of suppressing degradation of the secondary battery 11 and ensuring safety.

Figure 16:
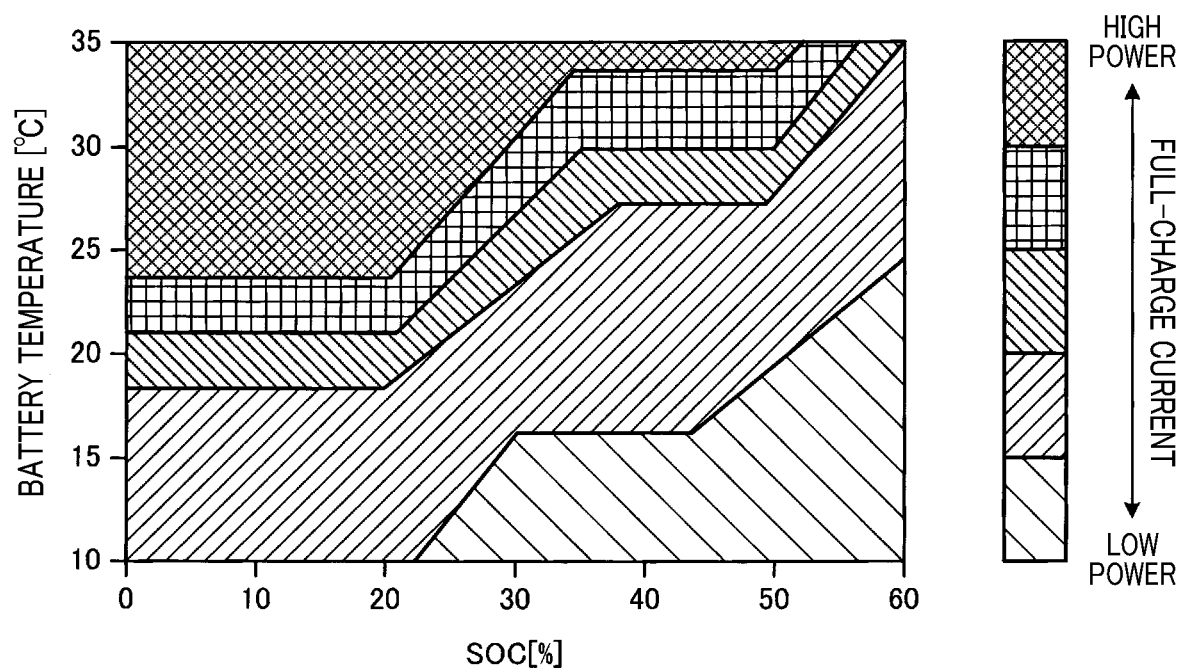
FIG. 16 is a diagram of a relationship between the full-charge current, the SOC, and a battery temperature according to the fourth embodiment.

Next, the relationship between the SOC and the temperature of the secondary battery 11 and the full-charge current will be described with reference to FIG. 16. As shown in FIG. 16, an SOC region and a temperature region that are appropriate for fast charging are present. As shown in FIG. 16, it is clear that the SOC is required to be low and the temperature is required to be high to increase the full-charge current.

Therefore, at step S416, the information calculation system 1 determines the appropriate SOC and the appropriate battery temperature in light of the appropriate charging power determined at step S415 and the relationship between the SOC and the battery temperature such as that in FIG. 16.

Here, a definition of the SOC of the secondary battery 11 is adjusted based on the second battery state $SOHQ_B2$ (that is, the degree of degradation of the secondary battery 11 related to capacity) upon arrival at the charging facility C. In addition, the full-charge current at which the voltage reaches the charging upper-limit voltage is changed based on the second battery state $SOHR_B2$ (that is, the degree of degradation of the secondary battery 11 related to resistance) upon arrival at the charging facility C.

For example, through use of a maximum voltage value $V_{allowable\ value}$ that is allowed for charging and an electrical resistance value $R_{upon\ arrival}$ of the secondary battery 11 upon arrival at the charging facility C, set in advance, an unknown full-charge current I is determined from $I=V_{allowable\ value}/R_{upon\ arrival}$. Here, $R_{upon\ arrival}$ is a value that is obtained by an amount of resistance (overvoltage) that has increased as a result of degradation of the secondary battery 11 being added to the resistance value of the secondary battery 11 before degradation (that is, in the initial state).

Furthermore, an amount of heat generation in the secondary battery 11 during charging can be calculated based on the full-charge current I and the resistance value of the secondary battery 11 upon arrival at the charging facility C. The charging time and the charging current can be determined taking into consideration the calculated amount of heat generation and the relationship between the SOC and the battery temperature such as that shown in FIG. 16.

Next, at step S417, the information calculation system 1 controls an operation of the vehicle 1 such that the SOC and the temperature of the secondary battery 11 approaches the appropriate SOC and the appropriate battery temperature when the vehicle 10 arrives at the charging facility C. For example, when the appropriate battery temperature is relatively higher than the current battery temperature, the information calculation system 1 operates a heater and increases the temperature of the secondary battery 11, or stops or reduces a cooling function of the secondary battery 11 provided in the vehicle 10. In addition, for example, when the appropriate SOC is relatively lower than the current SOC, the information calculation system 1 controls driving such that power consumption is actively increased and sets the SOC upon arrival at the charging facility C to the appropriate SOC.

Here, the information calculation system 1 is merely required to control driving of the vehicle 10 such that the SOC and the battery temperature of the secondary battery 11 when the vehicle 10 arrives at the destination G is closer to the appropriate SOC and the appropriate battery temperature than the current SOC and battery temperature of the secondary battery 11. The SOC and the battery temperature are not necessarily required to coincide with the appropriate SOC and appropriate battery temperature upon arrival.

The information calculation system 1 according to the present embodiment is configured to be capable of performing a process such as that described above.

According to the present embodiment, the appropriate value of the SOC and the appropriate value of the temperature state of the secondary battery 11 when the vehicle 10 arrives at the charging facility C are calculated based on the calculated SOC and temperature state of the secondary battery 11 upon arrival at the destination G, the second degradation states, and the determined charging power. Therefore, these appropriate values can be calculated with high accuracy. Furthermore, the information calculation system 1 controls driving of the vehicle 10 such that the secondary battery 11 becomes closer to the appropriate value of the SOC and the appropriate value of the temperature state when the vehicle 10 arrives at the charging facility C. Therefore, the state of the secondary battery 11 upon arrival at the charging facility C can be made appropriate for charging. Charging can be efficiently performed.

Fifth Embodiment

According to a present embodiment, the information calculation system 1 predicts a future of the secondary battery 11 that is mounted in a vehicle that travels on a predetermined delivery route for a predetermined period, such as a package delivery vehicle of a transport company. In addition, for example, the information calculation system 1 is used to assist in aligning maintenance schedules of the secondary batteries 11 in a plurality of package delivery vehicles owned by the transport company. As a result of the maintenance schedules being aligned, maintenance of many package delivery vehicles can be performed at once.

For example, the information calculation system 1 according to the present embodiment is used to predict degradation of the secondary batteries 11 in a plurality of package delivery vehicles that handle package deliveries in differing areas. For example, according to the present embodiment, an example in which the information calculation system 1 predicts the degradation of the secondary batteries 11 that are provided in three package delivery vehicles that respectively handle deliveries in three different areas is considered. A first vehicle repeatedly travels on a route A in a certain area. A second vehicle repeatedly travels on a route B in another area. A third vehicle repeatedly travels on a route C in still another area.

Figure 17:
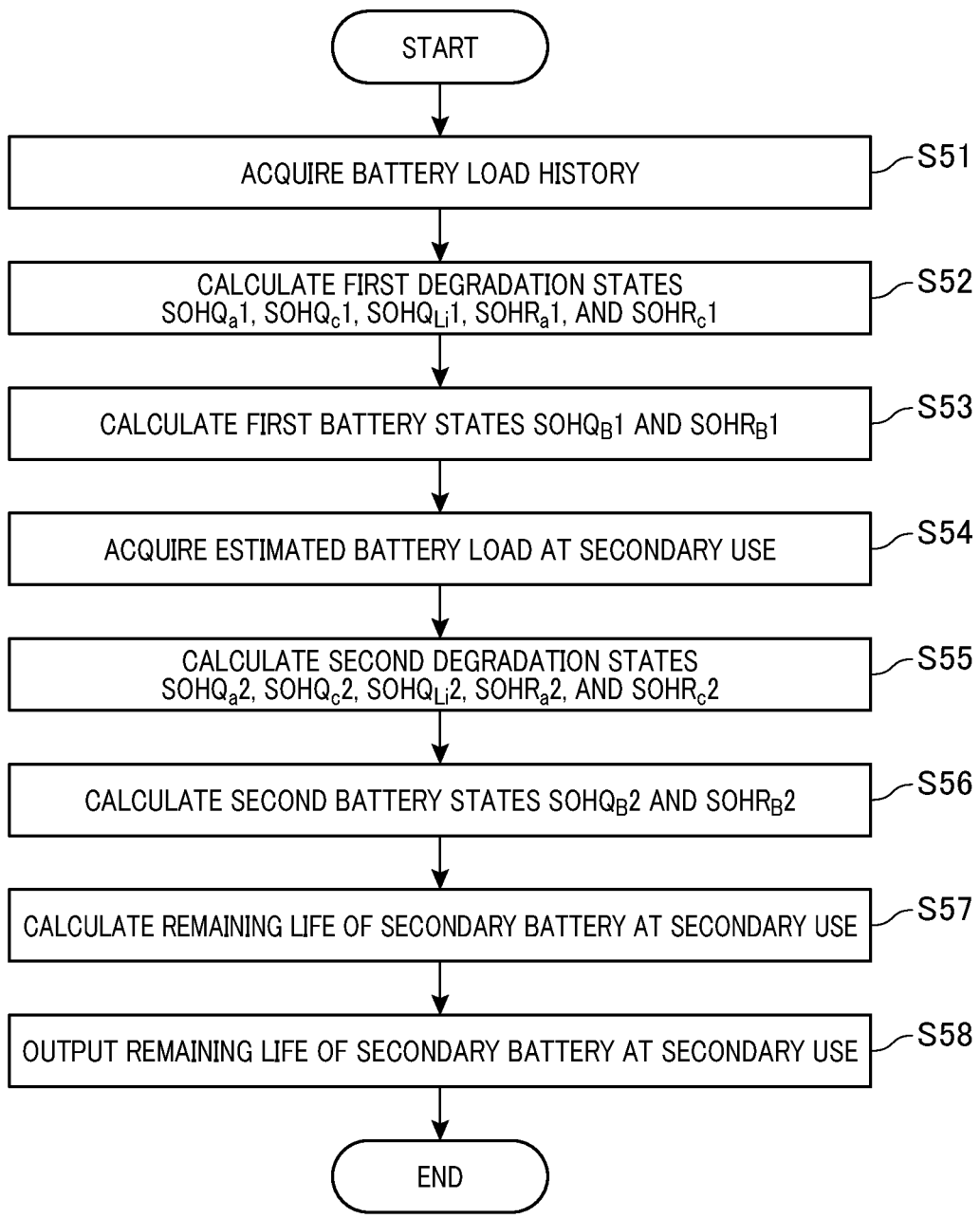
FIG. 17 is a flowchart for explaining a process performed by the information calculation system according to a fifth embodiment.

Here, according to the present embodiment, the example in which the degradation of the secondary batteries 11 in three vehicles is predicted is given. However, there may be two, or four or more vehicles. In addition, the vehicles may be traveling in a same area as long as the routes on which the vehicles are traveling differ. The present embodiment will be described below with reference to a flowchart in FIG. 17.

First, at step S51, the information calculation system 1 acquires the battery load history of a load that acts on the vehicle, from each vehicle. The battery load history includes the traveling distance, and the charging/discharge current, the charging/discharge time, the charging/discharge voltage, the environmental temperature, ΔDOD, and a number of operating days of the secondary battery 11. A method for acquiring these pieces of information is not particularly limited. For example, the charging/discharge current, the charging/discharge time, the charging/discharge voltage, the environmental temperature, and ΔDOD of the secondary battery 11 can each be an average value of actual measurement values, or a value of a root mean square of the actual measurement values.

Here, for example, the charging/discharge current and the charging/discharge time of the secondary battery 1 can also be converted from map information (such as the section average vehicle speed, the section altitude, and the charging facility information [such as position and charging capabilities]) that is acquired from the car navigation system provided in the vehicle. In addition, the charging/discharge voltage can be converted from current integration. ΔDOD of the secondary battery 11 can be converted from the voltage or converted from current integration. In addition, the environmental temperature can be an annual average temperature of the area in which the vehicle is traveling, an annual average temperature during a time period in which the vehicle is traveling in the area, or the like Next, at step S52, the information calculation system 1 calculates the first degradation states $SOHQ_a1$, $SOHQ_c1$, $SOHQ_{Li}1$, $SOHR_a1$, and $SOHR_c1$ in a manner similar to that according to the first embodiment, using the acquired battery load history. For example, in terms of the first vehicle, the information calculation system 1 calculates the first degradation states during actual traveling on the route A.

Next, at step S53, the information calculation system 1 calculates the first battery states $SOHQ_B1$ and $SOHR_B1$ in a manner similar to that according to the first embodiment, using the calculated first degradation states. An example of results up to this point is shown in Table 1, below.

TABLE 1

|  | Delivery route | | |
| --- | --- | --- | --- |
|  | A | B | C |
| Traveling distance [km] | 100 | 50 | 200 |
| Charging/discharge current [A] | 60 | 80 | 90 |
| Charging/discharge time [h] | 7 | 2 | 9 |
| Charging/discharge voltage [V] | 3.75 | 3.87 | 3.67 |
| Environmental temperature [° C.] | 27 | 22 | 36 |
| ΔDOV [V] | 40 | 20 | 80 |
| Number of operation days [days] | 550 | 200 | 320 |
| Capacity decrease rate [%] | 82 | 90 | 74 |
| Resistance increase rate [%] | 115 | 114 | 120 |

Next, at step S54, the information calculation system 1 acquires the estimated battery load that is predicted to act on the secondary battery 11 when, for each vehicle, any of the routes A to C is selected as the route on which the vehicle travels next. For example, the first vehicle that has traveled on the route A as a past route is assumed to travel on the route B next, and the estimated battery load is acquired.

In a manner similar to the battery load history (see Table 1, above) of the past route, the estimated battery load includes the traveling distance of the predetermined route, the charging/discharge current, the charging/discharge time, the charging/discharge voltage, the environmental temperature, ΔDOD, and the number of operation days of the secondary battery 11. For example, the estimated battery load is acquired by a method similar to that for acquiring the battery load history of the past route.

Next, at step S55, the information calculation system 1 calculates the second degradation states $SOHQ_a2$, $SOHQ_c2$, $SOHQ_{Li}2$, $SOHR_a2$, and $SOHR_c2$ of the secondary battery 11 at the secondary use in a manner similar to the first embodiment, using the acquired estimated load information.

Next, at step S56, the information calculation system 1 calculates the second battery states $SOHQ_B2$ and $SOHR_B2$ in a manner similar to that according to the first embodiment, using the second degradation states. A calculation method thereof is similar to that according to the first embodiment.

Next, at step S57, the information calculation system 1 calculates a life of the secondary battery 11. A method for calculating the life of the secondary battery 11 will be described with reference to FIG. 18.

Figure 18:
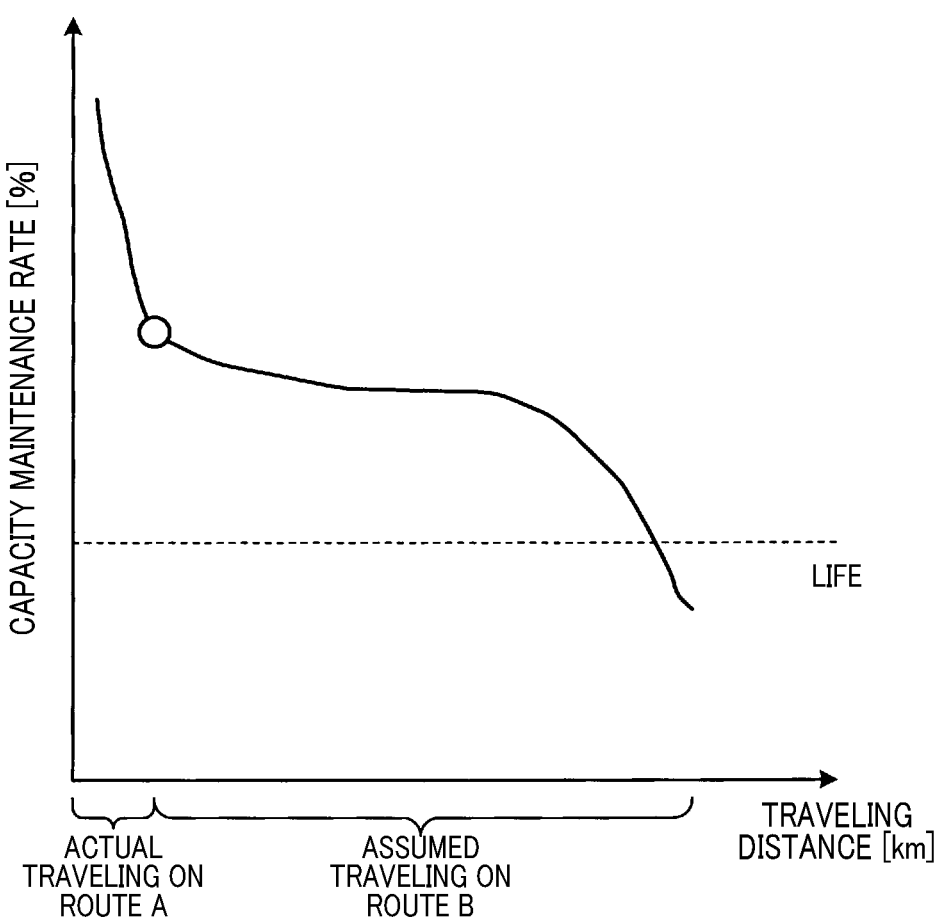
FIG. 18 is a flowchart for explaining a process performed by the information calculation system according to the fifth embodiment.

FIG. 18 shows the calculation results of the first battery state $SOHQ_B1$ and the second battery state $SOHQ_B2$ when the first vehicle (that is, the vehicle of which the route on which the vehicle has actually traveled in the past is the route A) is assumed to travel on the route B in the future. A section that is plotted by a symbol ○ (open circle) in FIG. 18 indicates the traveling distance and the capacity maintenance rate after the vehicle has actually traveled on the route A and before the vehicle travels on the route B. In addition, a broken line in FIG. 18 indicates a life value of the capacity maintenance rate of the secondary battery 11. For example, the life value of the capacity maintenance rate is prescribed in advance by a vehicle manufacturer. As a result, the life when the first vehicle travels on the route B in the future can be calculated. This also similarly applies to the resistance increase rate.

In addition, in a similar manner, the life value of the capacity maintenance rate and the life value of the resistance increase rate are each calculated for when the next route of the first vehicle is the route A and the route C. The results are shown in Table 2.

TABLE 2

|  | Future delivery route | | |
| --- | --- | --- | --- |
|  | A | B | C |
| Capacity life [days] | 80.5 | 44.4 | 17.3 |
| Resistance life [days] | 95.7 | 36.8 | 40.0 |

As described above, the life value of the capacity maintenance rate and the life value of the resistance increase rate when the first vehicle that has traveled on the route A in the past travels on the route A, B, or C next are acquired. Here, the smaller value of the life value of the capacity maintenance rate and the life value of the resistance increase rate is determined to be the life of the secondary battery 11.

Regarding the secondary battery 11 of the second vehicle that has traveled on the route B in the past and the secondary battery 11 of the third vehicle that has traveled on the route C in the past as well, the life value of the capacity maintenance rate and the life value of the resistance increase rate when the future route is each of the routes A to C are similarly calculated.

Next, at step S58, the information calculation system 1 calculates the life value of the secondary battery 11. For example, the life value is outputted as a remaining travelable distance (for example, the remaining travelable distance is displayed in the display 5 or printed).

Then, regarding determination of respective future delivery routes of the first to third vehicles, the future delivery routes are determined such that the life values of the secondary batteries 11 of the first to third vehicles are similar numbers of days. As a result, the life values of the secondary batteries 11 of the first to third vehicles can be set closer to each other. The maintenance schedules of the first to third vehicles can be aligned.

Here, in the present example, the vehicle in which the secondary battery 11 is mounted is a package delivery vehicle of a transport company. However, this is not limited thereto. For example, the secondary battery 11 may be mounted in a vehicle that is required to travel on a substantially fixed route (such as a vehicle for commuting).

The present disclosure is not limited to the above-described embodiments. Various modifications are possible without departing from the spirit of the invention. The steps according to the embodiments may be performed by a single server computer. Alternatively, each processing step may be performed by a differing server computer.

In addition, according to another embodiment, a set of computer-executable instructions of a program for causing a computer (processor) to execute at least a part of the processes according to the above-described embodiments, and a non-transitory computer-readable storage medium in which a set of computer-executable instructions of a program is stored can be considered. Furthermore, according to still another embodiment, an information calculation method in which a computer (processor) executes at least a part of the processes according to the above-described embodiments can be considered.

What is claimed is:

1. An information calculation system comprising:
   a history acquiring unit that acquires a battery load history of a secondary battery that has been used;
   a first degradation calculating unit that calculates first degradation states of a plurality of battery constituent elements of the secondary battery, based on the battery load history acquired by the history acquiring unit and a plurality of degradation factors related to each of the battery constituent elements;
   an estimated load acquiring unit that acquires estimated load information on a load that is estimated to act on the secondary battery when the secondary battery is used in a future application; and
   a second degradation calculating unit that calculates future second degradation states of the plurality of battery constituent elements of the secondary battery when the secondary battery is used in the future application, based on the first degradation states related to the battery constituent elements calculated by the first degradation calculating unit, the estimated load information acquired by the estimated load acquiring unit, and the plurality of degradation factors related to the battery constituent elements, wherein:
   the first degradation calculating unit and the second degradation calculating unit calculate the first degradation states and the second degradation states using a plurality of functions that are correlated with a plurality of degradation factors of a negative electrode of the secondary battery, a plurality of functions that are correlated with a plurality of degradation factors of a positive electrode of the secondary battery, and a plurality of functions that are correlated with a plurality of degradation factors of an electrolyte of the secondary battery.

2. The information calculation system according to claim 1, further comprising:
   a value calculating unit that calculates a residual value of the secondary battery based on the future application of the secondary battery and the second degradation states of the secondary battery calculated by the second degradation calculating unit.

3. An information calculation system comprising:
   a history acquiring unit that acquires a battery load history of a secondary battery that has been used;

a first degradation calculating unit that calculates first degradation states of a plurality of battery constituent elements of the secondary battery, based on the battery load history acquired by the history acquiring unit and a plurality of degradation factors related to each of the battery constituent elements;

an estimated load acquiring unit that acquires estimated load information on a load that is estimated to act on the secondary battery when the secondary battery is used in a future application; and a second degradation calculating unit that calculates future second degradation states of the plurality of battery constituent elements of the secondary battery when the secondary battery is used in the future application, based on the first degradation states related to the battery constituent elements calculated by the first degradation calculating unit, the estimated load information acquired by the estimated load acquiring unit, and the plurality of degradation factors related to the battery constituent elements, wherein:

the future application of the secondary battery is vehicle driving;

the information calculation system further includes a facility information receiving unit that receives charging capabilities of a charging facility, an arrival state calculating unit that calculates a charging state of the secondary battery and a temperature state of the secondary battery when the vehicle arrives at the charging facility, and a vehicle control unit that controls operations of the vehicle, in which the second degradation calculating unit calculates the second degradation states when the vehicle arrives at the charging facility, the vehicle control unit determines a charging power based on the charging state calculated by the arrival state calculating unit, the second degradation states calculated by the second degradation calculating unit, and the charging capabilities of the charging facility received by the facility information receiving unit, calculates an appropriate value of the charging state and an appropriate value of the temperature state of the secondary battery when the vehicle arrives at the charging facility, based on the charging state and the temperature state of the secondary battery calculated by the arrival state calculating unit, the second degradation states calculated by the second degradation calculating unit, and the determined charging power, and controls the operations of the vehicle such that the secondary battery approaches the appropriate value of the charging state and the appropriate value of the temperature state when the vehicle arrives at the charging facility.

4. The information calculation system according to claim 1, wherein:

the future application of the secondary battery is vehicle driving;

the information calculation system further includes a facility information receiving unit that receives charging capabilities of a charging facility, an arrival state calculating unit that calculates a charging state of the secondary battery and a temperature state of the secondary battery when the vehicle arrives at the charging facility, and a vehicle control unit that controls operations of the vehicle, in which the second degradation calculating unit calculates the second degradation states when the vehicle arrives at the charging facility, the vehicle control unit determines a charging power based on the charging state calculated by the arrival state calculating unit, the second degradation states calculated by the second degradation calculating unit, and the charging capabilities of the charging facility received by the facility information receiving unit, calculates an appropriate value of the charging state and an appropriate value of the temperature state of the secondary battery when the vehicle arrives at the charging facility, based on the charging state and the temperature state of the secondary battery calculated by the arrival state calculating unit, the second degradation states calculated by the second degradation calculating unit, and the determined charging power, and controls the operations of the vehicle such that the secondary battery approaches the appropriate value of the charging state and the appropriate value of the temperature state when the vehicle arrives at the charging facility.

5. The information calculation system according to claim 1, wherein:

a past application and the future application of the secondary battery are vehicle driving; and a life of the secondary battery is calculated based on the second degradation states of the secondary battery calculated by the second degradation calculating unit.

6. An information calculation system comprising:

a processor;

a non-transitory computer readable storage medium; and a set of computer-executable instructions stored on the computer readable storage medium that, when read and executed by the processor, cause the processor to implement:

acquiring a battery load history of a secondary battery that has been used;

calculating first degradation states of a plurality of battery constituent elements of the secondary battery, based on the battery load history acquired and a plurality of degradation factors related to each of the battery constituent elements;

acquiring estimated load information on a load that is estimated to act on the secondary battery when the secondary battery is used in a future application; and calculating future second degradation states of the plurality of battery constituent elements of the secondary battery when the secondary battery is used in the future application, based on the first degradation states related to the battery constituent elements calculated, the estimated load information acquired, and the plurality of degradation factors related to the battery constituent elements, wherein:

the first degradation states and the second degradation states are calculated using a plurality of functions that are correlated with a plurality of degradation factors of a negative electrode of the secondary battery, a plurality of functions that are correlated with a plurality of degradation factors of a positive electrode of the secondary battery, and a plurality of functions that are correlated with a plurality of degradation factors of an electrolyte of the secondary battery.

7. An information calculation method comprising:

acquiring a battery load history of a secondary battery that has been used;

calculating first degradation states of a plurality of battery constituent elements of the secondary battery, based on the battery load history acquired and a plurality of degradation factors related to each of the battery constituent elements;

acquiring estimated load information on a load that is estimated to act on the secondary battery when the secondary battery is used in a future application; and calculating future second degradation states of the plurality of battery constituent elements of the secondary battery when the secondary battery is used in the future application, based on the first degradation states related to the battery constituent elements calculated, the estimated load information acquired, and the plurality of degradation factors related to the battery constituent elements, wherein:

the first degradation states and the second degradation states are calculated using a plurality of functions that are correlated with a plurality of degradation factors of a negative electrode of the secondary battery, a plurality of functions that are correlated with a plurality of degradation factors of a positive electrode of the secondary battery, and a plurality of functions that are correlated with a plurality of degradation factors of an electrolyte of the secondary battery.

* * * * *